United States Patent [19]

Sato

[11] Patent Number: 4,957,355
[45] Date of Patent: Sep. 18, 1990

[54] RETROFOCUS TYPE LENS SYSTEM

[75] Inventor: Haruo Sato, Kawaguchi, Japan

[73] Assignee: Nikor Corp., Japan

[21] Appl. No.: 325,088

[22] Filed: Mar. 17, 1989

Related U.S. Application Data

[63] Continuation-in-part of Ser. No. 133,726, Dec. 16, 1987, abandoned.

[30] Foreign Application Priority Data

| Dec. 24, 1986 | [JP] | Japan | 61-313854 |
| Dec. 25, 1986 | [JP] | Japan | 61-309685 |
| Jun. 14, 1988 | [JP] | Japan | 63-146011 |
| Jun. 20, 1988 | [JP] | Japan | 63-151585 |

[51] Int. Cl.$^5$ .................. G02B 13/04; G02B 13/18
[52] U.S. Cl. ............................. 350/432; 350/458
[58] Field of Search ............... 350/432–435, 350/458, 459, 460, 461, 462

[56] References Cited

U.S. PATENT DOCUMENTS

| 3,864,026 | 2/1975 | Glatzel | 350/458 |
| 3,992,085 | 11/1976 | Momiyama | 350/459 X |
| 4,311,367 | 1/1982 | Mori | 350/461 |
| 4,770,512 | 9/1988 | Ikari | 350/458 X |

FOREIGN PATENT DOCUMENTS

| 55-147607 | 11/1980 | Japan | 350/462 |
| 58-202414 | 11/1983 | Japan . | |
| 61-140910 | 6/1986 | Japan . | |
| 1238668 | 7/1971 | United Kingdom . | |

Primary Examiner—Scott J. Sugarman

[57] ABSTRACT

A retrofocus type lens system has a first lens group having a negative refracting power and a second lens group having a positive refracting power in the order named from an object side. The second lens group is constituted by a front group having a positive refracting power and a rear group which has a positive refracting power and is movable along an optical axis to have a focusing function. The rear group of the second lens group has an aspherical lens having at least one aspherical surface. The aspherical lens has a shape with which a negative refracting power is gradually increased from its vertex to its periphery.

11 Claims, 9 Drawing Sheets

RETROFOCUS TYPE LENS SYSTEM

This is a continuation-in-part application of Ser. No. 133,726 filed Dec. 16, 1987, now abandoned.

BACKGROUND OF THE INVENTION:

1. Field of the Invention

The present invention relates to a retrofocus type wide angle lens and, more particularly, to a retrofocus type lens capable of close distance correction.

2. Related Background Art

A focusing method of a retrofocus type lens is often achieved by entire extension for integrally extending an entire lens system. However, in a lens system which is entirely moved upon focusing, a total weight of movable groups including a lens barrel holding the lens system is increased. In particular, in an ultra-wide angle lens system or a lens system having a very long back focus as compared to a focal length, a negative refracting power of a front group is increased, and aberration correction cannot be performed. In order to prevent this, the number of lenses is increased, and a front-element diameter is normally increased, resulting in large total length and weight.

However, in a lens system for a camera incorporating an auto-focus mechanism, a response time must be short, a movable section must be compact and light in weight, and a moving distance thereof must be small. Moreover, a retrofocus type lens system of a two-group structure has strong asymmetrical characteristics. Therefore, when an object distance is changed and a photographing magnification is changed upon focusing, various aberrations, in particular, astigmatism, curvature of field, and coma, are considerably changed as compared to other aberrations. For this reason, various efforts have been conventionally made to render a lens system compact and to improve operability while performing aberration correction by means of the following prior art.

A first prior art is a method for relatively moving a given lens group while performing entire extension in a retrofocus type lens system. For example, the first prior art is disclosed in British Patent No. 1,238,668.

As disclosed in Japanese Patent Laid-Open (Kokai) No 140910/1986, a second prior art is a method wherein two lenses located at an object side are fixed, and all other lens groups located at an image side are moved to perform focusing.

As disclosed in U.S. Patent Publication No. 4,311,367 and Japanese Patent Laid-Open No. 202414/1983, a third prior art is a rear-group extension method wherein only a lens group closest to an image side is moved to perform focusing.

However, the above-mentioned prior art has the following drawbacks, respectively.

In the method of the first prior art for moving a given lens group while performing entire extension to perform close distance correction, the weight of movable groups including a lens barrel is very large as in the entire extension method, and the total length of the lens system is increased. For example, in entire extension type focusing in British Patent No. 1,238,688, an ultra-wide angle lens system or a lens system having a very long back focus as compared to a focal length has a strong refracting power of a front group, and aberration correction cannot be performed. In order to prevent this, the number of lenses is increased, and a diameter of lenses of the front group is increased, resulting in large total length and weight. Therefore, in the method wherein entire extension is performed while moving a given lens group to perform close distance correction, the lens system is large and heavy, resulting in poor operability.

In the method of the second prior art, disclosed in Japanese Patent Laid-Open (Kokai) No. 140910/1986, wherein two of three front-group lenses located at an object side are fixed, and all other lens groups closer to an image side than the two fixed lenses are moved to perform focusing, focusing groups to be moved have a large size and become heavy. The lens system is inconvenient for a lens system for a camera incorporating an auto-focus mechanism in view of operability. In addition, the method of correcting various aberrations disclosed in this patent is insufficient. In an ultra-wide angle lens having a large field angle, in particular, changes in coma and curvature of field in a close distance photographing mode cannot be sufficiently corrected.

In the rear-group extension method of the third prior art, disclosed in Japanese Patent Laid-Open No. 143517/1980, (U.S. Pat. No. 4,311,367) wherein a lens group closest to the image side is moved to perform focusing, a movable lens group is compact and light in weight, and is suitable for a lens system for a camera incorporating an auto-focus mechanism. However, in a close distance photographing mode, changes in various aberrations, in particular, coma are considerable. Furthermore, in the method disclosed in Japanese Patent Laid-Open (Kokai) No. 202414/1983, the weight of the focusing group can be reduced, and the number of lens can also be decreased, resulting in good operability. However, changes in various aberrations, in particular, coma in a close distance photographing mode cannot be sufficiently corrected as in the lens system disclosed in Japanese Patent Laid-Open No. 143517/1980.

SUMMARY OF THE INVENTION

It is therefore an object of the present invention to provide a retrofocus type lens system of a rear-group extension type which has good focusing performance in a close distance photographing mode, and has small weight, size, and moving distance.

It is another object of the present invention to provide a retrofocus type lens system of a rear-group extension type in which coma can be satisfactorily corrected over a wide range from infinity to closest focusing distance.

According to the present invention, there is provided a retrofocus type lens system having a first lens group having a negative refracting power and a second lens group having a positive refracting power in the order named from an object side, wherein the second lens group is constituted by a front group having a positive refracting power and a rear group which has a positive refracting power and is movable along an optical axis to have a focusing function, and the rear group of the second lens group has an aspherical lens having at least one aspherical surface. The aspherical lens has a shape with which a negative surface refracting power is gradually increased from its vertex to its periphery. An aperture is arranged at an object side in the rear group of the second lens group with respect to the aspherical lens. When the rear group of the second lens group is extended toward an object along the optical axis, a close distance object is focused. Note that the surface refracting power means a difference between an incident angle and an exit angle of an arbitrary ray which becomes incident on an arbitrary point of a refracting surface, i.e., an angle of deflection, and this is defined as a surface refracting power of a small surface near a refracting point. When a parallel ray incident near the refracting point is converged after refraction, the surface refracting power of the surface is defined as a positive surface refracting power, and when it is diverged after refraction, it is defined as a negative surface refracting power. In addition, the second lens group includes an aperture determining an f-number.

According to the present invention, degradation in close distance performance, in particular, variations in spherical aberration and variations in coma and curvature of field can be reduced, and the coma and the curvature of field can be well balanced. In particular, the coma can be improved. Not only changes in coma and curvature of field can be corrected by the aspherical surface in the rear group but also an absolute amount of coma can be decreased. Therefore, a compact retrofocus type lens system which has improved close distance performance and operability and in which various aberrations can be satisfactorily corrected can be obtained. The above and other objects, features, and effects of the present invention will be apparent from the following description taken in conjunction with the accompanying drawings.

DESCRIPTION OF THE PREFERRED EMBODIMENTS

For the sake of easy understanding of the present invention, principles of variations in aberrations, in particular, spherical aberration and coma of a retrofocus type lens system of a rear-extension type when an aspherical lens is not included in a rear group, moved for focusing, of the retrofocus type lens system, and a normal spherical lens is used will be described with reference to FIGS. 2 and 3.

(1) Spherical Aberration

Figure 2:
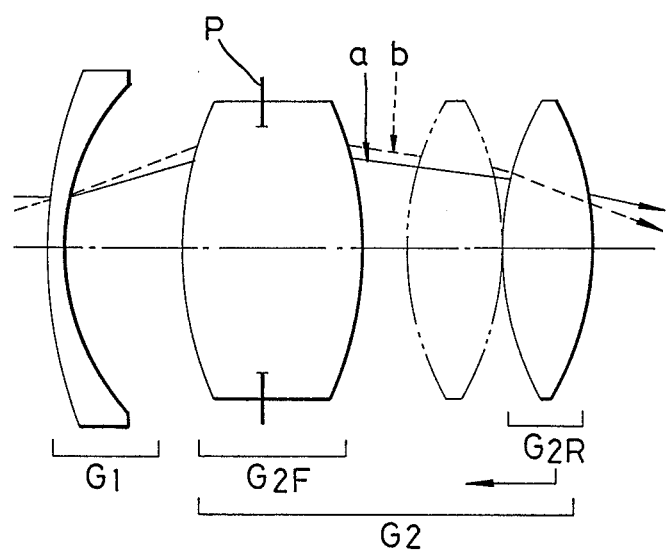
FIG. 2 is a view showing a principle of variations in spherical aberration in a retrofocus type lens system of a rear-group extension type and for explaining an optical path.

In FIG. 2, assume that a rear group $G_{2R}$ which has a positive refracting power, is closest to an image side, and has a focusing function, is extended toward an object side, as indicated by phantom lines, to focus the rear group $G_{2R}$ on a closest object point, and a Rand ray incident on a surface of the rear group $G_{2R}$ closest to the object side tends to be converged (i.e., an $\alpha$ value in a paraxial ray tracing formula is positive). In this case, an incident height of a Rand ray a incident on the rear group $G_{2R}$ as indicated by a solid line is increased since the rear group $G_{2R}$ is extended as indicated by the phantom lines in FIG. 2. Therefore, the rear group $G_{2R}$ having a positive refracting power is extended toward the object side, so that a positive surface refracting power with respect to a ray b incident from the closest object point of the rear group $G_{2R}$ as indicated by a broken line is increased. For this reason, since the positive surface refracting power is enhanced, spherical aberration when the focal point is formed at the closest object point is changed to be insufficiently corrected as a whole as compared to a spherical aberration when the focal point is formed at an infinity object point. If the Rand ray incident on the surface, closest to the object side, of the rear group $G_{2R}$ tends to be scattered (i.e., an $\alpha$ value in a paraxial ray tracing formula is negative), spherical aberration is changed to be excessively corrected when the rear group $G_{2R}$ having a positive refracting power is extended for the reason opposite to that described above.

In this case, however, a degree of a change in spherical aberration differs depending on a residual aberration of the rear group $G_{2R}$, a refracting power, moving distance, a surface refracting power of each surface in the rear group $G_{2R}$, and an incident angle of a ray incident on the rear group $G_{2R}$.

(2) Coma

Figure 3:
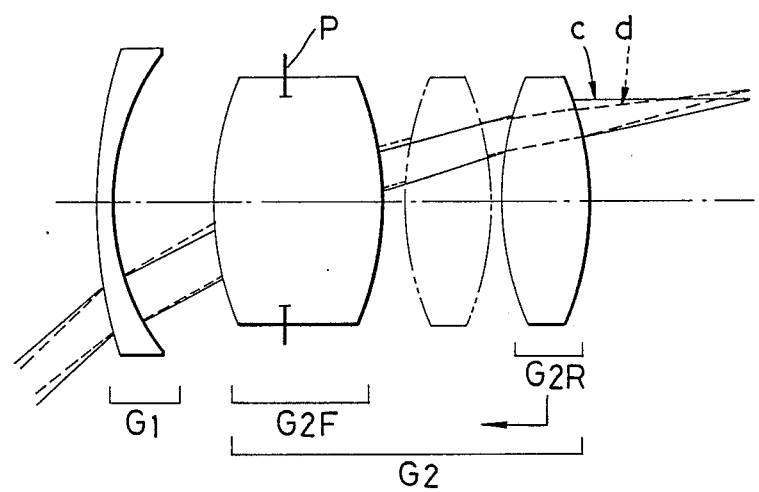
FIG. 3 is a view showing a principle of variations in coma in a retrofocus type lens system of a rear-group extension type and for explaining an optical path.

Next, paying attention to an oblique ray, assume that the rear group $G_{2R}$ having a positive refracting power and closest to the image side is extended toward the object side as indicated by two short dashed line in FIG. 3 to perform focusing. In this case, if an oblique ray incident from the closest object point like a ray indicated by a broken line d in FIG. 3 is not parallel to an optical axis, the incident height of the oblique ray incident on the rear group $G_{2R}$ becomes smaller than that of a ray incident from an infinity object point like an oblique ray indicated by a solid line c in FIG. 3, and a surface refracting power with respect to the oblique rays is weakened. Therefore, although the positive refracting power is weakened, since upper and lower rays in the oblique rays shown in FIG. 3 have different incident heights when they become incident on the rear group $G_{2R}$, surface refracting powers with respect to the upper and lower rays also differ from each other. When the rear group $G_{2R}$ having a positive refracting power is extended toward the object side, the positive refracting power of the rear group $G_{2R}$ is weakened and hence, the upper and lower oblique rays are leaped although the state depends on the refracting power of the groups, the surface refracting power of each surface, a residual aberration, a moving distance, and the like. For this reason, symmetrical characteristics of the coma are unbalanced, and external coma is considerably degraded.

Therefore, in focusing by the rear-group extension method of the retrofocus type lens system, aberrations, e.g., spherical aberration, coma, curvature of field, and the like are considerably changed for the above-mentioned reasons.

As is apparent from the description of the qualitative principle as described above, when the rear group $G_{2R}$ having a positive refracting power is extended toward the object side to perform focusing, the incident height of an oblique ray incident on the rear group $G_{2R}$ is lowered in association with the surface, closest to the object side, of the rear group $G_{2R}$, and the surface refracting power of the rear group $G_{2R}$ with respect to the oblique ray is weakened. Therefore, as shown in FIG. 3, the upper and lower rays in the oblique rays have different incident heights when they are incident on the rear group $G_{2R}$. Therefore, the oblique rays are leaped since the positive surface refracting power is weakened although a degree of variation differs in the upper and lower oblique rays. As a result, coma is changed toward an external coma.

Figure 1:
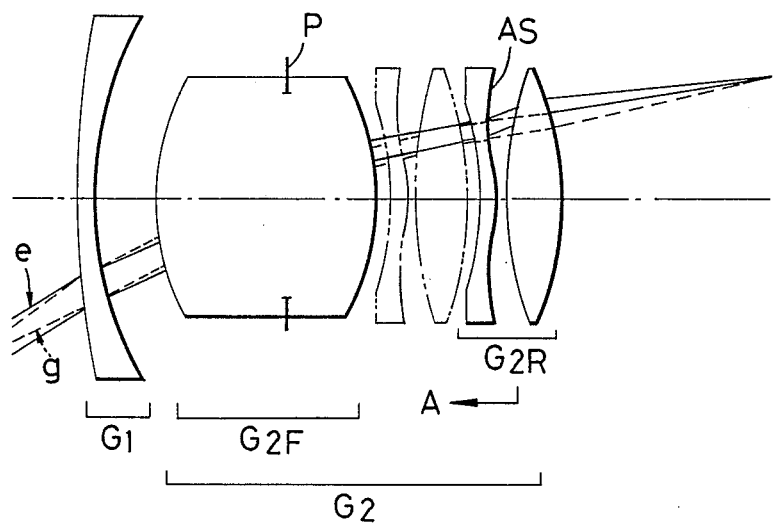
FIG. 1 is a view showing a first basic structure of a retrofocus type lens system according to the present invention.

In order to solve the above problem caused by the aberrations, according to the present invention, as shown in the basic structure shown in FIG. 1, a lens having a negative surface refracting power having an opposite effect with respect to a decrease in positive surface refracting power due to a decrease in incident height of the rear group $G_{2R}$ when the rear group $G_{2R}$ having a positive refracting power is extended toward an object side, can be arranged in the rear group $G_{2R}$ to have an appropriate balance between the positive and negative refracting powers. With this structure, these effects are canceled with each other, and variations in surface refracting powers can be eliminated. That is, a lens having a strong negative surface refracting power is arranged in the rear group $G_{2R}$ having the positive surface refracting power, and the positive and negative refracting powers can be determined such that a decrease in negative surface refracting power in the rear group $G_{2R}$ is larger than a decrease in positive surface refracting power in the rear group $G_{2R}$ upon a decrease in incident height of an oblique ray incident on the rear group $G_{2R}$ when the rear group $G_{2R}$ having the positive refracting power is extended toward the object side. Thus, if aberration correction is performed in advance and an incident height with respect to an oblique ray is changed in the entire rear group $G_{2R}$, the positive refracting power with respect to the oblique ray of the entire focusing group is not largely changed. For this reason, variations in coma can be minimized.

Therefore, an aspherical lens having a difference in surface refracting power between the lens periphery and its center, i.e., an aspherical lens in which a negative surface refracting power is increased toward the periphery, is arranged, so that the above effect can be achieved by a single lens. Of oblique rays shown in the first basic arrangement of the present invention shown in FIG. 1, a solid line e indicates an oblique ray from an infinity object point, and a broken line g indicates an oblique ray from a closest focusing distance object point.

This method is particularly effective for the upper ray of the oblique rays, and variations in coma can be minimized. A Sag amount of an aspherical surface, i.e., an offset ($|AS-S|$) from a reference spherical surface of a vertex along the optical axis, is determined depending on vertex diopter of a positive lens group in the rear group $G_{2R}$, a moving distance of the rear group $G_{2R}$ due to extension, a residual aberration of the lens system, and the like, and is changed depending on a location of the aspherical lens and an effective diameter of the lens. In a method wherein only the rear group $G_{2R}$ having the positive refracting power is extended toward the object side in parallel to the optical axis to perform focusing, an aspherical shape whose negative refracting power is increased from the vertex (center) of the lens toward its periphery is necessary.

In this manner, according to the present invention, the aspherical surface is formed in the rear group $G_{2R}$ to prevent degradation in close distance performance (in particular, degradation due to the coma), and variations in aberrations can be satisfactorily corrected over a wide range from the infinity to the closest focusing distance. More specifically, in a retrofocus lens system which can correct aberrations within a practical range with respect to a light ray from an infinity object point even though the aspherical surface is not formed, an aspherical surface having a characteristic to prevent degradation in close distance performance is formed in the rear group $G_{2R}$ having the focusing function of the second lens group, so that variations in aberrations at a close distance can be suppressed.

Therefore, the present invention is basically different from a conventional method of using an aspherical lens as in a method wherein an aspherical lens is arranged closest to the front portion or the rear portion of an optical system to correct distortion or curvature of field or a method wherein an aspherical lens is arranged near an aperture position to correct flare mainly caused by spherical aberration or sagital coma, and is different in the idea of a correcting method.

In the first basic arrangement wherein the entire rear group $G_{2R}$ of the second lens group is integrally moved shown in FIG. 1, a better effect can be expected if the following conditions (I) to (III) can be satisfied:

$$0 < \frac{|AS - S|}{f} < 0.2 \qquad (I)$$

$$-1.0 \leq \alpha \leq 1.0 \qquad (II)$$

$$0.7 \leq \frac{f_{2R}}{f} \leq 6.0 \qquad (III)$$

f: focal length of entire system

AS-S: difference between aspherical surface AS at outermost position of effective diameter and reference spherical surface S having predetermined radius of curvature of vertex along optical axis (sag amount)

$\alpha$: value obtained by calculating angle formed between optical axis and paraxial ray from axial infinity object point incident on a lens surface closest to object side of rear group $G_{2R}$ of second lens group $G_{2R}$, using $\alpha_1 = 0$ and $h_1 = f$ as initial values of the paraxial ray tracing formula $\alpha_1$: angle formed between paraxial ray incident on frontmost lens surface and optical axis $h_1$: incident height of paraxial ray incident on frontmost lens surface $f_{2R}$: focal length of rear group $G_{2R}$ of second lens group Assuming that a refracting power of a front lens group $G_{2F}$ in the second lens group is positive, the positive refracting power as the entire lens group can be shared with the focusing group. Therefore, the lens structure can be simplified, and focusing performance can be improved.

The conditions (I) to (III) will be described below.

The condition (I) indicates a ratio of the sag amount to the focal length f of the entire lens system. If the upper limit of the condition (I) is exceeded, formation of the aspherical surface is difficult to achieve, and a problem of machining errors or a problem of degradation in performance with respect to decentration is posed. For this reason, productivity of the aspherical lens is degraded. In addition, due to an influence of a high order (5th order or higher) caused by a Rand ray having a large incident height, spherical aberration is increased, and optical performance is degraded.

Therefore, the sag amount of the aspherical surface AS preferably falls within the range of the condition (I) in practice. At least one aspherical surface whose negative surface refracting power with respect to an oblique ray is increased from the vertex toward the periphery is formed in the rear group $G_{2R}$ of the second lens group $G_2$, and the positive and negative surface refracting powers are appropriately combined in the rear group $G_{2R}$, thereby minimizing variations in coma over a wide range from the infinity to the closest focusing distance.

As for the spherical aberration, the refracting power balance of the front and rear groups $G_{2F}$ and $G_{2F}$ is determined such that the a value is set to be an appropriate value as in the condition (II). Thus, the Rand ray incident on a surface closest to the object side of the focusing group as the rear group $G_{2R}$ can be substantially parallel to the optical axis. When the Rand ray becomes almost parallel to the optical axis, if the focusing group $G_{2R}$ is extended to form a focal point at the closest distance object point, the incident height of the Rand ray incident on each surface of the focusing group is almost not changed. For this reason, a change in surface refracting power of each surface with respect to the Rand ray can be suppressed, and variations in spherical aberration due to extension for focusing can be noticeably reduced. However, when the $\alpha$ value of the condition (II) exceeds 1.0, since the Rand ray incident on the surface of the rear group $G_{2R}$ closest to the object side is considerably converged, the incident height of the Rand ray is considerably increased, and the positive refracting power with respect to the Rand ray is also considerably increased. As a result, spherical aberration is considerably changed to be insufficiently corrected. In the condition (II), if the $\alpha$ value is below $-1.0$, the incident height of the Rand ray incident on the surface of the rear group $G_{2R}$ closest to the object side is decreased, and the positive refracting power with respect to the Rand ray is weakened. As a result, the spherical aberration is changed to be excessively corrected.

On one hand, when the curvature of field is negatively changed in close distance focusing mode, the $\alpha$ value is not set to be completely 0, but is preferably set to slightly converge a ray. With the above setting of the $\alpha$ value, the characteristics of the field, the spherical aberration, and coma can be well balanced. Therefore, image quality tends to be improved, and the $\alpha$ value for aberration correction and field characteristics can be well balanced. On the other hand, when the curvature of field is positively changed during in close distance focusing mode, the $\alpha$ value is set to slightly diverge a ray, and a balance with the field characteristics can be improved.

As for the shape of the aspherical lens of the present invention, the negative surface refracting power at the periphery is increased, and the negative surface refracting power at the vertex (center) is set to be 0 or a value about 0, so that the spherical aberration of a high order due to the Rand ray having the large incident height can be corrected.

In the present invention, the negative surface refracting power of the aspherical lens arranged in the rear group $G_{2R}$ is gradually increased toward the periphery. For this reason, when the Rand ray having the large incident height is incident on the aspherical lens and the incident angle is increased, even if the $\alpha$ value tends to be converged (positively changed) due to the influence of the high-order aberration, the spherical aberration may often be changed to be excessively corrected. This is because since the surface refracting power is negatively changed toward the periphery of the aspherical lens, the surface refracting power of the entire rear group is also negatively changed toward the periphery. Therefore, at the high position of incident light, since the extended lens surface has the negative surface refracting power, the excessive correction state tends to be set. Such a tendency of the high-order spherical aberration is incorporated in coma correction as the main feature of the present invention, so that the coma and the spherical aberration can be well balanced.

In the condition (II), the $\alpha$ value corresponding to an angle formed between the optical axis and the paraxial ray from the axial infinity object point and incident on the lens surface of the rear group $G_{2R}$ closest to the object side is known as the value obtained by multiplying a refractive index of a medium at the object side immediately before the surface in the paraxial ray tracing formula, and can be calculated by the following ray tracing formulas (1) to (7). That is, the value obtained by the following formulas while initial values $\alpha_1$ and $h_1$ of a ray incident on the first surface closest to the object side are given as $\alpha_1 = 0$ and $h_1 = f$ (total focal length of the lens system):

$$\alpha_k' = \alpha_k + h_k \phi_k \quad (1)$$

$$\alpha_{k+1} = \alpha_k' \quad (2)$$

$$h_{k+1} = h_k - e_k' d_k' \quad (3)$$

for $$\alpha_k = N_k U_k \quad (4)$$

$$\alpha_k' = N_k' U_k' = N_{k+1} U_{k+1} \quad (5)$$

$$\phi_k = (N_k' - N_k)/r_k \quad (6)$$

$$e_k' = d_k'/N_k' \quad (7)$$

where $r_k$: radius of curvature of kth surface
$h_k$: incident height of kth surface
$\phi_k$: surface refracting power of vertex of kth surface
$U_k$: angle between paraxial ray incident on kth surface and optical axis
$d_k$: distance between vertices of kth surface and (k+1)th surface
$N_k, N_{k+1}$: refractive indices with respect to d ray When the focal length of the rear group $G_{2R}$ is determined by an optimal refracting power balance satisfying the condition (III), the coma and the curvature of field can be satisfactorily corrected. If the upper limit of the condition (III) is exceeded, i.e., if the focal length of the rear group $G_{2R}$ is too large, the residual aberration of the rear group $G_{2R}$ can be reduced. However, the moving distance of the rear group $G_{2R}$ upon focusing is increased, and hence, a lens for a single-lens reflex camera whose back focus is limited is hard to realize. When the focal length of the rear group $G_{2R}$ is large, i.e., when the refracting power of the rear group $G_{2R}$ is small, the surface refracting powers of the surfaces of the rear group $G_{2R}$ are weakened, and the coma, in particular, close distance variations in upper coma can be easily eliminated. However, since the moving distance is large, if a focal point is formed at the close distance object point, the incident height of the oblique ray incident on the divergent first lens group $G_1$ is greatly changed. Therefore, a change in lower coma is increased. Variations in lower coma must be sufficiently reduced in the divergent first lens group $G_1$. This is because correction of variations in lower coma by the aspherical surface AS in the rear group $G_{2R}$ is limited. When the lower limit of the condition (III) is not reached, the moving distance of the rear group $G_{2R}$ is advantageously reduced, but aberration correction is difficult to achieve. Thus, the number of lenses in the rear group $G_{2R}$ is increased, and its weight is increased. Since the focal length of the rear group $G_{2R}$ is reduced, the refracting power of the surfaces is increased. Therefore, variations in aberration due to extension of the lens for focusing are increased. Even if the variations in aberration can be suppressed, an offset of the aspherical surface from the spherical surface, e.g., the sag amount, exceeds the upper limit of the condition (I).

Therefore, the first basic structure is arranged to appropriately satisfy the conditions (I) to (III), thereby suppressing the spherical aberration and the curvature of field. In this structure, the number of lenses in the rear group $G_{2R}$ can be reduced, the weight is also decreased, and the moving distance of the rear group $G_{2R}$ can be decreased. When this structure is applied to a lens for a camera incorporating an auto-focus mechanism, movable members for focusing must be compact and light in weight, and their moving distance must also be reduced. Therefore, the above structure is very effective.

Figure 4:
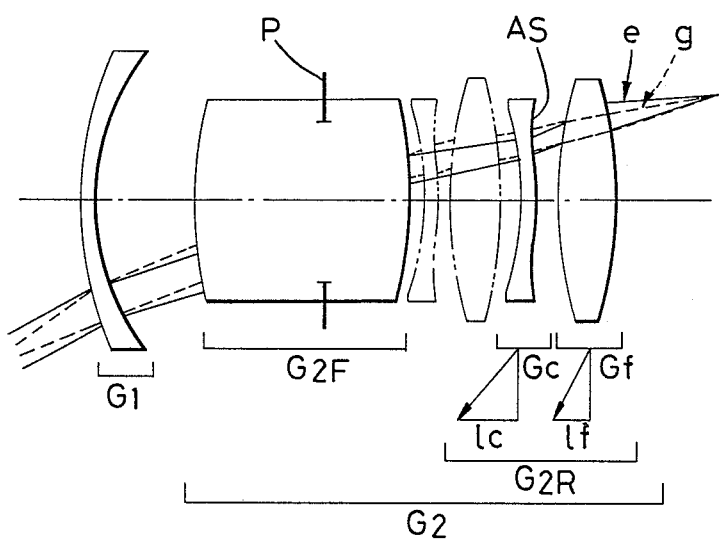
FIG. 4 is a view showing a second basic structure of a retrofocus type lens system according to the present invention.

FIG. 4 shows a second basic structure according to another embodiment of the present invention, wherein the rear group $G_{2R}$ in the second lens group $G_2$ is further divided into two groups, so that these two groups are relatively displaced during focusing.

A rear-group extension retrofocus type lens system according to the present invention shown in FIG. 4 is a retrofocus type lens system having a first lens group $G_1$ having a negative refracting power, and a second lens group $G_2$ having a positive refracting power in the order named from the object side. The second lens group $G_2$ is constituted by a front group $G_{2F}$ having a positive refracting power and a rear group $G_{2R}$ having a positive refracting power and serving as a focusing lens group. The rear group $G_{2R}$ has a correction group $G_c$ having a focusing correction function, and a focusing group $G_f$ having a focusing function. The correction group $G_c$ has an aspherical lens having at least one aspherical surface AS. The aspherical lens has a shape whose negative refracting power is increased from its vertex to the periphery. An aperture P is arranged closer to the object side than the aspherical lens in the correction group $G_c$. The correction group $G_c$ and the focusing group $G_f$ are relatively displaced while being extended toward the object side along the optical axis, so that a close distance object is focused.

In the second basic structure of the present invention described above, the better effect can be expected if the following conditions (IV) to (VII) are satisfied:

$$0 < \frac{|AS - S|}{f} < 0.2 \quad \text{(IV)}$$

$$-1.0 \leq \alpha_c \leq 1.0 \quad \text{(V)}$$

$$-1.0 \leq \alpha_f \leq 1.0 \quad \text{(VI)}$$

$$0 < \left| \frac{l_c}{l_f} \cdot \frac{f_f}{f_c} \right| \leq 6.0 \quad \text{(VII)}$$

where f: focal length of entire system

AS–S: difference between aspherical surface AS at outermost position of effective diameter and reference spherical surface S having predetermined radius of curvature of vertex along optical axis (sag amount)

$\alpha_c$: value obtained by calculating angle formed between optical axis and paraxial ray from axial infinity object point incident on a lens surface, closest to object side, of correction group $G_c$ in rear group $G_{2R}$ of second lens group $G_2$, using $\alpha_1 = 0$ and $h_1 = f$ as initial values of the paraxial ray tracing formula $\alpha_f$: value obtained by calculating angle formed between optical axis and paraxial ray from axial infinity object point incident on a lens surface, closest to object side, of correction group $G_f$ in rear group $G_{2R}$ of second lens group $G_2$, using $\alpha_1 = 0$ and $h_1 = f$ as initial values of the paraxial ray tracing formula $\alpha_1$: angle formed between paraxial ray incident on frontmost lens surface and optical axis $h_1$: incident height of paraxial ray incident on frontmost lens surface $l_c$: focusing moving distance of correction group $G_c$ of rear group $G_{2R}$ of second lens group $G_2$ $l_f$: focusing moving distance of correction group $G_f$ of rear group $G_{2R}$ of second lens group $G_2$ $f_c$: focal length of correction group $G_c$ in rear group $G_{2R}$ of second lens group $G_2$ $f_f$: focal length of correction group $G_f$ in rear group $G_{2R}$ of second lens group $G_2$ Note that the correction group $G_c$ and the focusing group $G_f$ are distinguished such that one having a larger absolute value of the refracting power is defined as a focusing group.

The refracting power of the front group $G_{2F}$ of the second lens group $G_2$ is set to be positive. Thus, since the positive refracting power as the entire lens group can be shared with the rear group $G_{2R}$, the focusing performance can be improved, and the lens structure can be simplified in the same manner as in the first basic structure shown in FIG. 1.

In the second basic structure of the present invention, as shown in FIG. 4, in order to further enhance the effect of the aspherical surface, the correction group $G_c$ having the focusing correction function in the rear group $G_{2R}$ of the second lens group $G_2$ and the second focusing group $G_f$ having the focusing function in the rear group $G_{2R}$ of the second lens group $G_2$ are relatively moved along the optical axis, so that the surface refracting powers of the correction group $G_c$ and the focusing group $G_f$ are very satisfactorily balanced. Therefore, variations in coma can be more efficiently reduced than the first basic structure. Note that a solid line e is an oblique ray from an infinity object point, and a broken line g is an oblique ray from a closest distance object point.

This method is particularly effective for an upper ray of the oblique rays, and variations in coma can be minimized. The sag amount of the aspherical lens, i.e., an offset of the vertex from the reference spherical surface ($|AS-S|$) is determined by the refracting powers of the vertices of the positive lens groups of the correction group $G_c$ and the focusing group $G_f$, the refracting power of the vertex of the aspherical lens, a moving distance by lens extension, a residual aberration of the lens system, and the like, and is changed depending on the location of the aspherical surface AS and an effective diameter of the aspherical lens. In the method wherein the correction group $G_c$ and the focusing group $G_f$ having the positive refracting powers are relatively moved along the optical axis to perform focusing, a lens must have an aspherical surface shape whose negative surface refracting power is increased from the vertex (center) toward the periphery of the lens. In addition, if the method wherein the correction group $G_c$ and the focusing group $G_f$ are nonlinearly moved to perform focusing is employed, a design margin can be increased.

In this manner, according to the second basic structure shown in FIG. 4, the aspherical surface AS is formed in the correction group $G_c$ in the rear group $G_{2R}$ of the second lens group $G_2$, so that degradation in close distance performance (in particular degradation in coma) can be prevented, and variations in aberration to the closest focusing distance can be prevented and corrected. That is, in a retrofocus type lens system which can correct aberrations within a practical range with respect to an infinity object point without an aspherical surface, an aspherical surface for preventing degradation in close distance performance is formed in the correction group $G_c$, and the correction group $G_c$ and the focusing group $G_f$ are relatively moved along the optical axis to perform focusing, thereby satisfactorily performing close distance aberration correction.

The conditions (IV) to (VII) will be described hereinafter. The condition (IV) is the same as the condition (I) in the first basic structure. If the upper limit of the condition (IV) is exceeded, the shape of the aspherical surface is complicated, and a problem of machining errors or a problem of degradation in performance with respect to decentration is posed. For this reason, productivity of the aspherical lens is degraded. In addition, due to an influence of a high order (5th order or higher) caused by a Rand ray having a large incident height, spherical aberration is increased, and optical performance is degraded. Therefore, the sag amount of the aspherical surface AS preferably falls within the range of the condition (VI) in practice. At least one aspherical lens whose negative surface refracting power with respect to an oblique ray is increased from the vertex to its periphery is arranged in the correction group $G_c$ of the rear group $G_{2R}$ of the second lens group $G_2$ within the range of the condition (IV), so that the appropriate positive and negative surface refracting powers are combined in the rear group $G_{2R}$ (i.e., the correction group $G_c$ and the focusing group $G_f$). In this manner, variations in coma over a range from the infinity to the closest focusing distance can be minimized.

As for the spherical aberration, the refracting power balance of the first and second groups $G_1$ and $G_2$ is determined such that the values of $\alpha_c$ and $\alpha_f$ are set to be appropriate values as in the conditions (V) and (VI). A Rand ray incident on the surface, closest to the object side, of the correction group $G_c$ and the focusing group $G_f$ can be converted to a ray substantially parallel to the optical axis. When the Rand ray is converted to substantially the parallel ray, even if the correction group $G_c$ and the focusing group $G_f$ are extended to form a focal point at the closest focusing distance object point, the incident heights of the rays incident on the respective surfaces of the focusing group are almost not changed. For this reason, a change in surface refracting power of each surface of the group with respect to the Rand ray can be minimized, and variations in spherical aberration due to extension for focusing can be considerably eliminated.

However, when both the $\alpha_c$ and $\alpha_f$ values in the conditions (V) and (VI) exceed 1.0, the Rand ray incident on the surface, closest to the object side, of the correction group $G_c$ and the focusing group $G_f$ is considerably converged. Therefore, when the correction lens group $G_c$ having the positive refracting power and including the aspherical lens having the positive surface refracting power and the focusing group $G_f$ having the positive refracting power are extended toward the object side in order to form a focal point on a closest focusing distance object point from the infinity object point, the incident heights of Rand rays incident on the surfaces, closest to the object side, of the correction group $G_c$ and the focusing group $G_f$ are considerably increased. Therefore, if both the correction group $G_c$ and the focusing group $G_f$ have the positive vertex refracting powers, the positive refracting power with respect to the Rand ray is increased, and the spherical aberration is considerably changed to be insufficiently corrected. When both the $\alpha_c$ and $\alpha_f$ values are below $-1.0$, the incident heights of the Rand rays incident on the surfaces, closest to the object side, of the correction group $G_c$ and the focusing group $G_f$ are decreased for the reason opposite to the above. Therefore, if both the correction group $G_c$ and the focusing group $G_f$ have the positive vertex refracting powers, the positive surface refracting power with respect to the Rand rays is weakened, and the spherical aberration is considerably changed to be excessively corrected.

On the other hand, when the $\alpha_c$ value is positive and $\alpha_f$ value is negative, or the $\alpha_c$ value is negative and $\alpha_f$ value is positive within the range of the conditions (V) and (VI), the spherical aberration depending on the $\alpha_c$ and $\alpha_f$ values is canceled such that the appropriate $\alpha_c$ and $\alpha_f$ values are combined, and correction may be satisfactorily performed.

In the second basic structure, the negative surface refracting power of the aspherical surface AS arranged in the focusing group $G_c$ is gradually increased toward the periphery. For this reason, when an incident angle of the Rand ray having a large incident height, which becomes incident on the aspherical lens, is large, even if the $\alpha_c$ value tends to be converged (i.e., to be positively changed) due to the influence of the high-order aberration and even if the entire group tends to have the positive refracting power, the spherical aberration tends to be changed to be excessively corrected due to the following reason. That is, since the surface refracting power of the aspherical lens is positively changed toward its periphery, the entire surface refracting power of the correction group $G_c$ and the focusing group $G_f$ becomes negative toward the periphery. Therefore, when the correction group $G_c$ and the focusing group $G_f$ are relatively moved along the optical axis, the lens surface having the negative surface refracting power is extended. Therefore, at the high position of incident height, the excessive correction tends to occur. The tendency of the high-order spherical aberration is incorporated in coma correction as one feature of the present invention, the coma and the spherical aberration can be well balanced.

The angles $\alpha_c$ and $\alpha_f$ formed between the optical axis and the paraxial rays from the infinity object point along the optical axis and incident on the lens surfaces, closest to the object side, of the correction group $G_c$ and the focusing group $G_f$ can be obtained as values obtained by multiplying a refractive index of a medium immediately before the corresponding surface from the above-mentioned paraxial ray tracing formulas (1) to (7).

A case will be described wherein the upper limit of the condition (VII) is exceeded with reference to the following cases (A) to (C):

(A): the focal length $f_f$ of the focusing group $G_f$ is considerably large, the focal length $f_c$ of the correction group $G_c$ is considerably small, and $l_c/l_f$ is small;

(B): the moving distance $l_c$ of the correction group $G_c$ is large as compared with the moving distance $l_f$ of the focusing group $G_f$ and the value of $f_f/f_c$ is small; and (C): a product of $f_f$ and $l_c$ is larger than a value six times a product of $f_c$ and $l_f$.

For the case (A), even if the positive refracting power of the correction group $G_c$ having the focusing correction function is increased and the value of $l_c/l_f$ is slightly changed, i.e., the ratio of the extension amounts of the correction group $G_c$ and the focusing group $G_f$ is slightly changed, various aberrations not along the optical axis are considerably varied. For this reason, it is difficult to satisfactorily balance the various aberrations, and a design margin is narrowed. In the problem of manufacture, a distance error due to relative displacement of the groups $G_c$ and $G_f$ becomes considerably strict, resulting in high cost. For the case (B), since the $l_c$ value is considerably large, the focusing moving distance $l_f$ of the focusing group $G_f$ is decreased. Since the refracting power of the focusing group $G_f$ is increased, a problem of various aberrations and a problem of a manufacturing error are posed for the same reason as above. The case (C) is not desirable due to both the reasons of the cases (A) and (B).

As described above, in the second basic structure, when the conditions (IV) to (VII) are set to appropriate values, the coma, spherical aberration, and curvature of field can be suppressed. In addition, since the numbers of lenses of the correction group $G_c$ and the focusing group $G_f$ can also be reduced, the total weight can be reduced, and hence, the moving distance can be decreased. In particular, the second basic structure is very effective when this embodiment is applied to a lens of a camera incorporating an auto-focus mechanism, which must have light movable portions for focusing, and a small moving distance thereof.

As shown in the basic structures of the present invention shown in FIGS. 1 and 4, an aspherical surface as the principle feature of the present invention provided to the rear group $G_{2R}$ in the second lens group $G_2$ can be formed by a plastic lens, the aspherical surface can more easily formed than a glass lens, and productivity can be improved. In addition, the number of lenses can be reduced as compared to a spherical lens, and the lens system can be compact and light in weight.

In the case of a plastic lens having an aspherical surface, its vertex refracting power is preferably set to be about 0.

More specifically, when a vertex refracting power $\phi$ of a lens having an aspherical surface satisfies the following condition (VIII), it is further effective.

(VIII) $0 \leq |\phi| \leq 0.05$ for $\phi = f^1$ where
  f: paraxial focal length (mm) of lens having aspherical surface As in the condition (VIII), since the surface refracting power of the vertex is greatly weakened and the influence on the paraxial ray can be minimized, changes in back focus or focal length of the entire system and variations in axial color aberration due to a change in temperature can be minimized. In the second basic arrangement shown in FIG. 4, if the correction group $G_c$ can be constituted by a single aspherical lens satisfying the above conditions, $f_c \approx \infty$. Therefore, a moving distance of the correction group $G_c$ for forming a focal point at a given close distance object point is not associated with focusing at a paraxial image point, and a necessary moving distance of the focusing group $G_f$ is substantially determined by the focal length of the focusing group $G_f$. Therefore, a solution on design calculation corresponding to linear or nonlinear moving path of the correction group $G_c$ can be realized. For this reason, the margin of aberration correction is increased, thus providing practical advantages in design.

Note that the aspherical lens in the rear group $G_{2R}$ is preferably manufactured by a hybrid method (a method for adhering a lens having a very small central thickness and at least one aspherical surface to a spherical glass lens). More specifically, when plastic is used, since a plastic lens has high temperature dependency of the refracting power as compared to a glass lens, variations in aberration tend to occur due to a change in temperature. However, when an aspherical plastic lens having a very small central thickness and a small surface refracting power of the vertex is used by the hybrid method, variations in paraxial aberrations and changes in back focus or focal length of the entire system due to a change in temperature can be suppressed.

Use of the hybrid type lens allows constituting the focusing group by one or two lenses, resulting in a compact lens system.

In order to correct the curvature of field or the coma, a lens closest to an image side most advantageously has an aspherical surface. However, when the plastic lens is used, the aspherical surface is formed at a location where the lens cannot be easily accessible in terms of safety. In addition, the first surface of a lens having an aspherical surface preferably has a convex surface facing an image surface in order to minimize the influence of the astigmatism and the curvature of field.

A formula of an aspherical surface for the shape of the aspherical lens in the rear group $G_{2R}$ in each embodiment of the present invention is as follows:

$$x = \frac{\frac{y^2}{R}}{1 + \sqrt{1 - \left(\frac{ky^2}{R^2}\right)}} + C_4 y^4 + C_6 y^6 + C_8 y^8 + C_{10} y^{10}$$

where R is a radius of curvature of the center (vertex) of an aspherical surface. The aspherical shape is a rotary-symmetrical aspherical surface with respect to the optical surface when k is a conical constant and $C_4$, $C_6$, $C_8$, and $C_{10}$ are high-order constants in an orthogonal system wherein a direction of optical axis is given as an x-axis, a direction perpendicular to the optical axis is given as y-axis.

Figure 5:
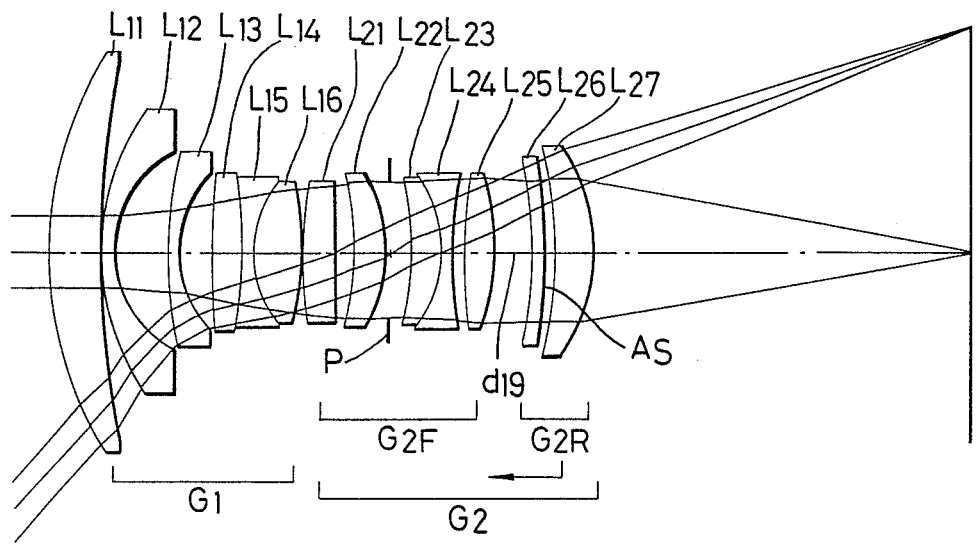
FIGS. 5 and 6 are views showing first and second embodiments of lens structures based on the first basic structure of the present invention, respectively.
Figure 6:
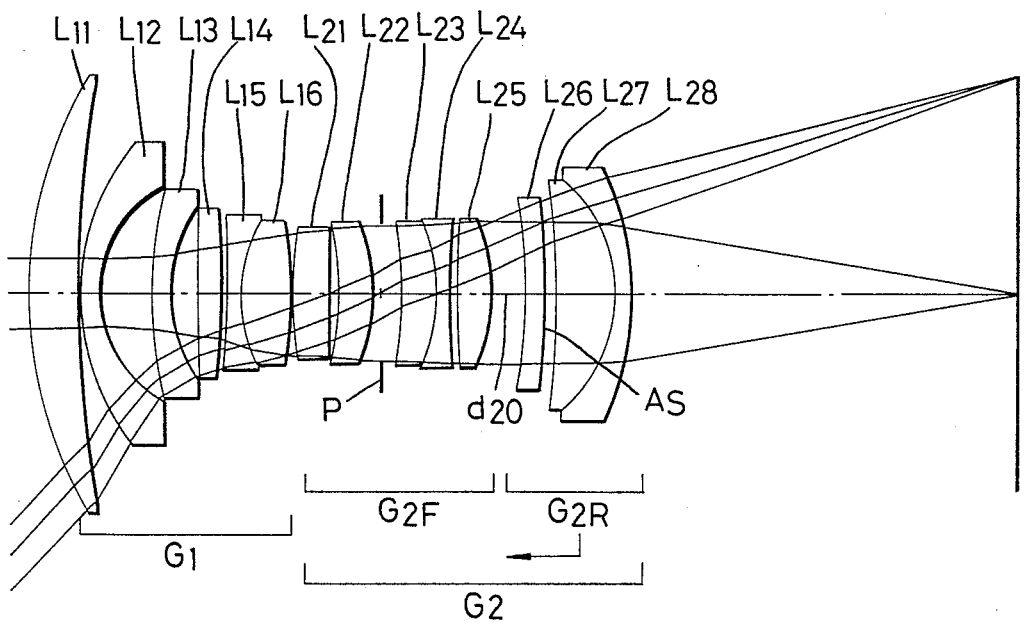
Figure 7:
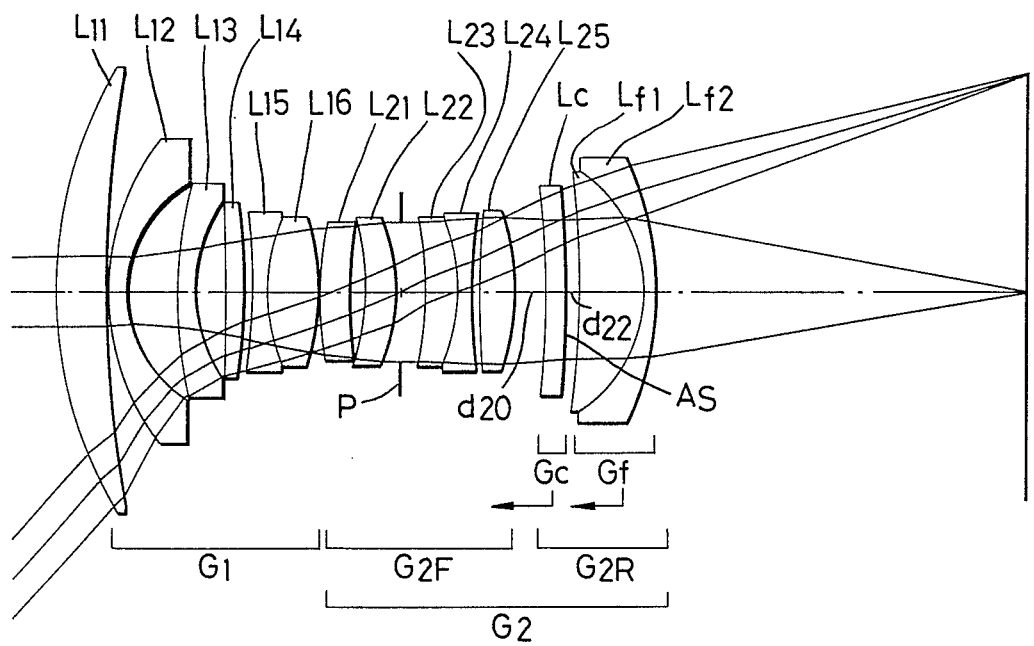
FIGS. 7 and 8 are views showing third and fourth embodiments of lens structures based on the second basic structure of the present invention, respectively.
Figure 8:
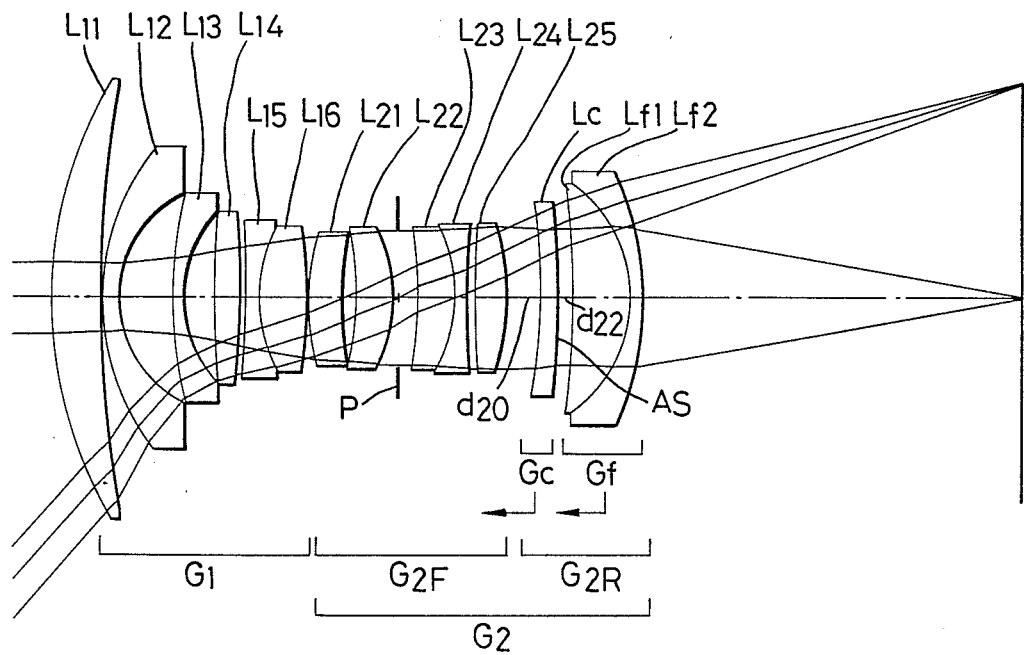

The structure and shape of the lens system according to an embodiment of the present invention will be described in detail. FIGS. 5 and 6 show retrofocus type lens systems based on the first basic structure shown in FIG. 1, and FIGS. 7 and 8 show retrofocus type lens systems based on the second basic structure shown in FIG. 4.

In the retrofocus type lens system according to the first embodiment of the present invention, a first lens group $G_1$ having the negative refracting power is constituted by a positive meniscus lens $L_{11}$ whose convex surface faces an object side, two negative meniscus lenses $L_{12}$ and $L_{13}$ whose convex surfaces face the object side, a positive lens $L_{14}$ whose one surface having a larger curvature than the other surface faces an image side, a negative lens $L_{15}$ which is bonded to the image-side surface of the positive lens $L_{14}$ and whose one surface having a larger curvature than the other surface faces the image side, and a positive lens $L_{16}$ which is bonded to the image-side surface of the positive lens $L_{15}$ and whose one surface having a larger curvature than the other surface faces the object side in the order named from the object side. A front group $G_{2F}$ having the positive refracting power of the second lens group $G_2$ is constituted by a positive meniscus lens $L_{21}$ whose convex surface faces the object side, a positive meniscus lens $L_{22}$ whose convex surface faces the image side, a positive meniscus lens $L23$ whose convex surface faces the image side, a negative lens $L_{24}$ which is bonded to the positive meniscus lens $L_{23}$ and whose one surface having a larger curvature than the other surface faces the object side, and a positive lens $L_{25}$ having two convex surfaces. A rear group $G_{2R}$ having the positive refracting power of the second lens group $G_2$ is constituted by a meniscus lens $L_{26}$ having an aspherical surface at the image side, and a positive meniscus lens whose convex surface faces the image side. The lenses in the rear group $G_{2R}$ as the focusing group of the second lens group $G_2$ are integrally moved along the optical axis, thereby performing focusing. More specifically, focusing is performed by utilizing an air gap $d_{19}$ between the positive lens $L_{25}$ having two convex surfaces and the menisus lens $L_{26}$ having the aspherical surface facing the image side.

Specifications of the first embodiment according to the present invention are summarized in Table 1 below. In Table 1, numerals in the leftmost column indicate the order from the object side, and a refractive index n and an Abbe number $\nu$ correspond to a d ray ($\lambda = 587.6$).

TABLE 1

(Embodiment 1)
Focal length: f = 20.442
F-number: 2.8
Field angle: $2\omega = 94°$

| No. | Radius of curvature r | Central thickness · Distance d | Refractive index n | ABBE number $\nu$ | |
|---|---|---|---|---|---|
| 1 | 37.995 | 5.000 | 1.51860 | 70.08 | $G_1$ |
| 2 | 95.859 | 0.100 | | | |
| 3 | 23.281 | 1.400 | 1.80458 | 25.49 | |
| 4 | 10.195 | 5.000 | | | |
| 5 | 36.935 | 1.200 | 1.71300 | 53.97 | |
| 6 | 12.047 | 3.200 | | | |
| 7 | 146.392 | 3.200 | 1.80458 | 25.49 | |
| 8 | −56.052 | 1.300 | 1.74810 | 52.28 | |
| 9 | 10.566 | 5.000 | 1.67270 | 32.16 | |
| 10 | −35.743 | 0.100 | | | $G_{2F}$ |
| 11 | 39.235 | 3.300 | 1.67270 | 32.16 | |
| 12 | 597.045 | 1.500 | | | |
| 13 | −36.762 | 3.200 | 1.58267 | 46.46 | |
| 14 | −14.665 | 2.600 | | | |
| 15 | −32.150 | 3.500 | 1.77279 | 49.44 | |
| 16 | −10.048 | 1.100 | 1.79504 | 28.61 | |
| 17 | 52.115 | 1.000 | | | |
| 18 | 59.969 | 3.000 | 1.51860 | 70.08 | |
| 19 | −20.708 | $d_{19}$ = variable | | | |
| 20 | −50.000 | 1.200 | 1.49108 | 57.57 | $G_{2R}$ |
| 21 | ◎ −50.000 | 1.200 | | | |
| 22 | −38.396 | 4.000 | 1.51860 | 70.08 | |
| 23 | −17.634 | Bf = variable | | | |

$r_{21}$ Aspherical surface(◎)
Bf 37.981 ~ 40.406
$d_{19}$ 3.623 ~ 1.252

Note that in the first embodiment described above, the values of the conditions (I) and (III) are as follows:

$$\frac{|AS - S|}{f} = 0.01144, \alpha = 0.39197$$

$$\frac{f_{2R}}{f} = 2.8520 \quad \begin{array}{l} f_{2R} = 58.299 \\ f = 20.442 \end{array}$$

Aspherical coefficients of a 21st surface ($r_{21}$) in the first embodiment are as follows.
k = 1.0
$C_4 = 0.3994 \times 10^{-4}$
$C_6 = -0.4918 \times 10^{-7}$
$C_8 = 0.1319 \times 10^{-8}$
$C_{10} = -0.7495 \times 10^{-11}$ According to the second embodiment of the present invention, as shown in FIG. 6, a first lens group $G_1$ having the negative refracting power is constituted by a positive meniscus lens $L_{11}$ whose convex lens faces an object side, two negative meniscus lenses $L_{12}$ and $L_{13}$ whose convex surfaces face the object side, a positive lens $L_{14}$ whose one surface having a larger curvature than the other surface faces an image side, a negative lens $L_{15}$ whose one surface having a larger curvature than the other surface faces the image side, and a positive lens $L_{16}$ bonded to the lens $L_{15}$ and whose one surface having a larger curvature than the other surface faces the object side in the order named from the object side. A front group $G_{2F}$ having the positive refracting power of the second lens group $G_2$ is constituted by a positive meniscus lens $L_{21}$ whose convex surface faces the object side, a positive meniscus lens $L_{22}$ whose convex surface faces the image side, an aperture P, a positive meniscus lens $L_{23}$ whose convex surface faces the image side, a negative lens $L_{24}$ which is bonded to the positive meniscus lens $L_{23}$ and whose one surface having a larger curvature than the other surface faces the object side, and a positive lens $L_{25}$ having two convex surfaces. The rear group $G_{2R}$ having the positive refracting power of the second lens group $G_2$ is constituted by a meniscus lens $L_{26}$ having an aspherical surface at an object side, a positive meniscus lens $L_{27}$ whose convex surface faces the image side, a negative meniscus lens $L_{28}$ which is to the lens $L_{27}$ and whose convex surface faces the image side. The lenses in the rear group $G_{2R}$ as the focusing group of the second lens group $G_2$ are integrally moved along the optical axis to perform focusing. More specifically, focusing is performed by utilizing an air gap $d_{20}$ between the positive lens $L_{26}$ having the two convex surfaces, and the meniscus lens $L_{26}$ having the aspherical surface at the image side.

A difference between the structures of the second embodiment and the first embodiment shown in FIG. 5 will be described below. In the first embodiment, the positive lens $L_{14}$, the negative lens $L_{15}$, and the positive lens $L_{16}$ of the first lens group $G_1$ are bonded to each other. However, in the second embodiment, the positive lens $L_{14}$ and the negative lens $L_{15}$ are separated from each other, and the negative lens $L_{15}$ and the positive lens $L_{16}$ are bonded to each other. The meniscus lens $L_{26}$ closest to the object side in the focusing group $G_{2R}$ has the aspherical surface, and the positive meniscus lens $L_{27}$ is bonded to the negative meniscus lens $L_{28}$.

Specifications of the second embodiment according to the present invention are summarized in Table 2. In Table 2, numerals in the leftmost column represent the order from the object side, and a refractive index n and an Abbe number $\nu$ are values correspond to a d ray ($\lambda=587.6$)

TABLE 2

(Embodiment 2)
Focal length: f = 20.537
F-number: 2.89
Field angle: $2\omega = 95°$

| No. | Radius of curvature r | Central thickness · Distance d | Refractive index n | ABBE number $\nu$ | |
|---|---|---|---|---|---|
| 1 | 40.684 | 5.350 | 1.48749 | 70.24 | $G_1$ |
| 2 | 134.136 | 0.100 | | | |
| 3 | 25.122 | 1.500 | 1.79504 | 28.61 | |
| 4 | 10.858 | 5.350 | | | |
| 5 | 38.293 | 1.300 | 1.67025 | 57.58 | |
| 6 | 12.480 | 3.200 | | | |
| 7 | 251.347 | 2.150 | 1.80458 | 25.49 | |
| 8 | −100.595 | 0.550 | | | |
| 9 | −375.019 | 1.400 | 1.74810 | 52.28 | |
| 10 | 13.494 | 5.350 | 1.67270 | 32.16 | $G_{2F}$ |
| 11 | −51.750 | 0.100 | | | |
| 12 | 40.944 | 3.500 | 1.67270 | 32.16 | |
| 13 | 606.477 | 1.100 | | | |
| 14 | −26.965 | 3.400 | 1.59507 | 35.51 | |
| 15 | −15.776 | 2.700 | | | |
| 16 | −37.264 | 3.750 | 1.78797 | 47.53 | |
| 17 | −16.451 | 1.200 | 1.78470 | 26.07 | |
| 18 | 98.285 | 1.050 | | | |
| 19 | 174.298 | 3.200 | 1.50137 | 56.46 | |
| 20 | −19.483 | $d_{20}$ = variable | | | |
| 21 | ⊙ −80.075 | 1.800 | 1.49108 | 57.57 | $G_{2R}$ |
| 22 | −80.074 | 1.255 | | | |
| 23 | −73.455 | 6.000 | 1.69680 | 55.61 | |
| 24 | −14.371 | 1.600 | 1.71736 | 29.48 | |
| 25 | −26.293 | Bf = variable | | | |

$r_{21}$ Aspherical surface (⊙)
Bf 38.596 ~ 40.932
$d_{20}$ 3.377 ~ 1.041

Note that in the second embodiment described above, the values of the conditions (I) to (III) are as follows:

$$\frac{|AS - S|}{f} = 0.01006, \alpha = 0.3672$$

$$\frac{f_{2R}}{f} = 2.7592 \quad \begin{matrix} f_{2R} = 56.558 \\ f = 20.537 \end{matrix}$$

Aspherical coefficients of a 21st surface ($r_{21}$) in the second embodiment are as follows.
k=1.0
$C_4 = -0.2279 \times 10^{-4}$
$C_6 = 0.2280 \times 10^{-8}$
$C_8 = -0.1096 \times 10^{-8}$
$C_{10} = 0.6201 \times 10^{-11}$ In a retrofocus type lens system according to the third embodiment, as shown in FIG. 7, a first lens group $G_1$ having the negative refracting power is constituted by a positive meniscus lens $L_{11}$ whose convex surface faces the object side, negative meniscus lenses $L_{12}$ and $L_{13}$ whose convex surfaces face the object side, a positive lens $L_{14}$ whose one surface having a larger curvature than the other surface faces an image side, a negative lens $L_{15}$ whose one surface having a larger curvature than the other surface faces the image side, and a positive lens $L_{16}$ which is bonded to the image-side surface of the negative lens $L_{15}$ and whose one surface having a larger curvature than the other surface faces the object side in the order named from the object side. A front group $G_{2F}$ having the positive refracting power of the second lens group $G_2$ is constituted by a positive meniscus lens $L_{21}$ whose convex surface faces the object side, a positive meniscus lens $L_{22}$ whose convex surface faces the image side, an aperture P, a positive meniscus lens $L_{23}$ whose convex surface faces the image side, a negative lens $L_{24}$ which is bonded to the lens $L_{23}$ and whose one surface having a larger curvature than the other surface faces the object side, and a positive lens $L_{25}$ whose one surface having a larger curvature than the other surface faces the image side. A correction group $G_c$ in the rear group $G_{2R}$ having the positive refracting power in the second lens group $G_2$ is constituted by a meniscus lens $L_c$ having an aspherical surface AS at the image side. A focusing group $G_f$ in the rear group $G_{2R}$ of the second lens group $G_2$ is constituted by a positive meniscus lens $L_{f1}$ whose convex surface faces the image side, and a negative meniscus lens $L_{f2}$ which is bonded thereto and whose convex surface faces the image side. The correction group $G_c$ and the focusing group $G_f$ are relatively moved along the optical axis to perform focusing. More specifically, by utilizing an air gap $d_{20}$ between the positive lens $L_{25}$ whose one surface having the larger curvature than the other surface faces the image side and the meniscus lens $L_{26}$ having the aspherical surface at the image side, and an air gap $d_{22}$ between the meniscus lens $L_c$ having the aspherical surface and the positive meniscus lens $L_{f1}$ whose convex surface faces the image side, the correction group $G_c$ and the focusing group $G_f$ are relatively moved along the optical axis to perform focusing.

Specifications of the third embodiment shown in FIG. 7 are summarized in Table 3. In Table 3, numerals in the leftmost column represent the order from the object side, and a refractive index n and an Abbe number $\nu$ are values correspond to a d ray ($\lambda=587.6$)

TABLE 3

(Embodiment 3)
Focal length: f = 20.43
F-number: 2.84
Field angle: 2ω = 94°

| No. | Radius of curvature r | Central thickness · Distance d | Refractive index n | ABBE number ν | |
|---|---|---|---|---|---|
| 1 | 40.829 | 5.350 | 1.48749 | 70.24 | $G_1$ |
| 2 | 134.005 | 0.100 | | | |
| 3 | 25.199 | 1.500 | 1.79504 | 28.61 | |
| 4 | 10.862 | 5.350 | | | |
| 5 | 38.806 | 1.300 | 1.67025 | 57.58 | |
| 6 | 12.467 | 3.200 | | | |
| 7 | 262.298 | 2.150 | 1.80458 | 25.49 | |
| 8 | −100.528 | 0.550 | | | |
| 9 | −375.086 | 1.400 | 1.74810 | 52.28 | |
| 10 | 13.868 | 5.350 | 1.67270 | 32.16 | $G_{2F}$ |
| 11 | −51.061 | 0.100 | | | |
| 12 | 41.413 | 3.500 | 1.67270 | 32.16 | |
| 13 | 602.176 | 1.100 | | | |
| 14 | −27.056 | 3.400 | 1.59507 | 35.51 | |
| 15 | −15.804 | 2.700 | | | |
| 16 | −38.208 | 3.750 | 1.78797 | 47.53 | |
| 17 | −16.474 | 1.200 | 1.78470 | 26.07 | |
| 18 | 103.533 | 1.050 | | | |
| 19 | 152.349 | 3.200 | 1.50137 | 56.46 | |
| 20 | −20.336 | $d_{20}$ = variable | | | |
| 21 | −80.000 | 1.800 | 1.49108 | 57.57 | $G_C$ |
| 22 | ⊙ −80.001 | $d_{22}$ = variable | | | |
| 23 | −83.420 | 6.000 | 1.69680 | 55.61 | $G_f$ |
| 24 | −14.454 | 1.600 | 1.71736 | 29.48 | |
| 25 | −27.124 | Bf = variable | | | |

$r_{22}$ Aspherical surface (⊙)
$d_{20}$ 3.3105 ~ 1.1060
$d_{22}$ 1.5974 ~ 1.4814
Bf 38.1052 ~ 40.4905

Note that in the second embodiment described above, the values of the conditions (IV) to (VII) are as follows:

$$\frac{l_c}{l_f} = 0.95, \frac{f_f}{f_c} = 0.00257$$

$$\alpha_c = 0.36628, \alpha_f = 0.36719$$

$$\frac{|AS - S|}{f} = 0.0104$$

$$\left|\frac{l_c}{l_f} \cdot \frac{f_f}{f_c}\right| = 0.002442$$

In the third embodiment, the aspherical coefficients of the 22nd surface ($r_{22}$) are as follows:
k=1.0
$C_4$=0.2149×10$^{-4}$ 4th order
$C_6$=−0.4244×10$^{-8}$ 6th order
$C_8$=0.5386×10$^{-9}$ 8th order
$C_{10}$=−0.2685×10$^{-11}$ 10th order In the fourth embodiment, as shown in FIG. 8, the first lens group $G_1$ having the negative refracting power is constituted by a positive meniscus lens $L_{11}$ whose convex surface faces the object side, negative meniscus surfaces $L_{12}$ and $L_{13}$ whose convex lenses face the object side, a positive lens $L_{14}$ whose one surface having a larger curvature than the other surface faces the image side, a negative lens $L_{15}$ whose one surface having a larger curvature than the other surface faces the image side, and a positive lens $L_{16}$ which is bonded to the lens $L_{15}$ and whose one surface having a larger curvature than the other surface faces the object side in the order named from the object side. A front group $G_{2F}$ having the positive refracting power of the second lens group is constituted by a positive meniscus lens $L_{21}$ whose convex surface faces the object side, a positive meniscus lens $L_{22}$ whose convex surface faces the image side, an aperture P, a positive meniscus lens $L_{23}$ whose convex surface faces the image side, a negative lens $L_{24}$ which is bonded to the lens $L_{23}$ and whose one surface having a larger curvature than the other surface faces the object side, and a positive lens $L_{25}$ whose one surface having a larger curvature than the other surface faces the image side. A correction group $G_c$ in a rear group $G_{2R}$ having the positive refracting power of the second lens group $G_2$ is constituted by a meniscus lens $L_c$ having an aspherical surface at the object side. A focusing group $G_f$ of the rear group $G_{2R}$ of the second lens group $G_2$ is constituted by a positive meniscus lens $L_{f1}$ whose convex surface faces the image side, and a negative meniscus lens $L_{f2}$ which is bonded to the lens $L_{f1}$ and whose convex surface faces the image side. The correction group $G_c$ and the focusing group $G_f$ are relatively moved along the optical axis to perform focusing. By utilizing an air gap $d_{20}$ between the positive lens $L_{25}$ whose one surface having a larger curvature than the other surface faces the image side and the meniscus lens $L_c$ having the aspherical surface AS at the object side, and an air gap $d_{22}$ between the meniscus lens $L_c$ having the aspherical surface and the positive lens $L_{f1}$ whose convex surface faces the image side, the correction group $G_c$ and the focusing group $G_f$ are relatively moved along the optical axis to perform focusing.

A major difference between the third and fourth embodiments is that the aspherical surface AS of the aspherical lens $L_c$ in the correction group $G_c$ is formed at the image side in the third embodiment shown in FIG. 7 and at the object side in the fourth embodiment shown in FIG. 8.

Specifications of the fourth embodiment according to the present invention are summarized in Table 4. In Table 4, numerals in the leftmost column represent the order from the object side, and a refractive index n and an Abbe number ν are values correspond to a d ray (λ=587.6)

TABLE 4

(Embodiment 4)
Focal length: f = 20.54
F-number: 2.89
Field angle: 2ω = 94°

| No. | Radius of curvature r | Central thickness · Distance d | Refractive index n | ABBE number ν | |
|---|---|---|---|---|---|
| 1 | 40.684 | 5.350 | 1.48749 | 70.24 | $G_1$ |
| 2 | 134.136 | 0.100 | | | |
| 3 | 25.122 | 1.500 | 1.79504 | 28.61 | |
| 4 | 10.858 | 5.350 | | | |
| 5 | 38.293 | 1.300 | 1.67025 | 57.58 | |
| 6 | 12.480 | 3.200 | | | |
| 7 | 251.347 | 2.150 | 1.80458 | 25.49 | |
| 8 | −100.595 | 0.550 | | | |
| 9 | −375.019 | 1.400 | 1.74810 | 52.28 | |
| 10 | 13.494 | 5.350 | 1.67270 | 32.16 | $G_{2F}$ |
| 11 | −51.750 | 0.100 | | | |
| 12 | 40.944 | 3.500 | 1.67270 | 32.16 | |
| 13 | 606.477 | 1.100 | | | |
| 14 | −26.965 | 3.400 | 1.59507 | 35.51 | |
| 15 | −15.776 | 2.700 | | | |
| 16 | −37.264 | 3.750 | 1.78797 | 47.53 | |
| 17 | −16.451 | 1.200 | 1.78470 | 26.07 | |
| 18 | 98.285 | 1.050 | | | |
| 19 | 174.298 | 3.200 | 1.50137 | 56.46 | |
| 20 | −19.483 | $d_{20}$ = variable | | | |
| 21 | ⊙ −80.075 | 1.800 | 1.49108 | 57.57 | $G_C$ |
| 22 | −80.074 | $d_{22}$ = variable | | | |
| 23 | −73.455 | 6.000 | 1.69680 | 55.61 | $G_f$ |

TABLE 4-continued (Embodiment 4)
Focal length: f = 20.54
F-number: 2.89
Field angle: 2ω = 94°

| No. | Radius of curvature r | Central thickness · Distance d | Refractive index n | ABBE number ν |
|---|---|---|---|---|
| 24 | −14.371 | 1.600 | 1.71736 | 29.48 |
| 25 | −26.293 | Bf = variable | | |

$r_{21}$ Aspherical surface (◉)
$d_{20}$ 3.3766 ~ 1.1576
$d_{22}$ 1.2553 ~ 1.1385
Bf 38.5960 ~ 40.9320

Note that the values of the conditions (IV) to (VII) in the fourth embodiment are as follows:

$$\frac{l_c}{l_f} = 0.95, \frac{f_f}{f_c} = 0.00259$$

$$\alpha_c = 0.36628, \alpha_f = 0.36719$$

$$\frac{|AS - S|}{f} = 0.01190$$

$$\left| \frac{l_c}{l_f} \cdot \frac{f_f}{f_c} \right| = 0.00246$$

In the fourth embodiment, the aspherical coefficients of the 21st surface ($r_{21}$) are as follows:
k=1.0
$C_4 = -0.2279 \times 10^{-4}$ 4th order
$C_6 = 0.2280 \times 10^{-8}$ 6th order
$C_8 = -0.1096 \times 10^{-8}$ 8th order
$C_{10} = 0.6201 \times 10^{-11}$ 10th order Fifth and sixth embodiments of the present invention shown in FIGS. 9 and 10 will now be described. In the fifth and sixth embodiments, a rearward group $G_{2R}$ has, in succession from the object side, an aspherical lens having an aspherical surface on the image side, and a meniscus lens component having a positive refractive power as a whole, and this positive meniscus lens component is of a construction having a positive meniscus lens having its convex surface facing the image side, and a negative meniscus lens joined thereto and having its convex surface facing the image side.

The fifth and sixth embodiments are constructed so as to satisfy the following condition (VIII):

$$-6 \leq \frac{r_b + r_a}{r_b - r_a} \leq -1.8 \quad \text{(VIII)}$$

where $r_a$ and $r_b$ are the radii of curvature of the surfaces of the positive meniscus lens component which are most adjacent to the object side and the image side, respectively.

Particularly in a retrofocus type wide angle lens having a wide angle of view, many limitations in aberration correction are suffered due to maintaining a sufficient back focal length. Moreover, in the fifth and sixth embodiments, a rear focus system is adopted in a retrofocus type wide angle lens having a great angle of view exceeding 100° to accomplish focusing from infinity to a close distance and therefore, a movement space for this focusing must be secured, and further limitations are suffered. Therefore, the present invention solves this problem by constructing the first lens group $G_1$ and the rearward group $G_{2R}$ of the second lens group into such an appropriate shape that the principal point of each lens therein becomes more adjacent to the image side, without increasing the number of constituent lenses or making the diameter of the forward lens nearest to the object side large.

However, in a retrofocus type wide angle lens adopting the rear focus system as of the present invention, it is necessary to consider particularly the shape of the rearward group.

That is, since as previously described, the aberration fluctuation by the rear focus system is greatly related with the movement and shape of the lens for focusing, the variation in the incidence height of the oblique ray incident on the rearward group $G_{2R}$ of the second lens poses a problem by the movement of said rearward group $G_{2R}$ resulting from focusing. Accordingly, in a retrofocus type wide angle lens having a wide angle of view, consideration particularly for the correction of the aberrations of the oblique ray is necessary.

Therefore, in the rearward group $G_{2R}$ of the second lens of the present invention, it is necessary to have an appropriate shape with a convex surface facing the stop so that the oblique ray is refracted with a minimum declination.

Also, when the angle of incidence at which the on-axis ray is incident on the rearward group $G_{2R}$ of the second lens is quite great, spherical aberration fluctuates substantially during focusing. Accordingly, it is necessary to have an appropriate shape for mitigating this.

Accordingly, to satisfy what has been described above, in the present invention, an optimum shape, i.e., an optimum shape factor, particularly in the positive lens component of the rearward group $G_{2R}$ is prescribed by the condition (VIII), and the principal point is moved out toward the image side to thereby secure a back focal length and yet, not only the spherical aberration by the on-axis ray but also the coma and curvature of image field by the off-axis ray are corrected very well.

However, if the upper limit of this condition is exceeded, an attempt to secure a back focal length and yet effect good aberration correction will result in an increased number of constituent lenses and the bulkiness of the entire lens system, and this is not preferable. Also, the positive lens component in the rearward group $G_{2R}$ of the second lens becomes approximately to a plano-convex shape and the oblique ray passing through this lens is refracted with a great declination and therefore, it becomes difficult to well correct the coma and curvature of image field during focusing by the aspherical lens of the present invention. As a result, spherical aberration and outward coma occur very greatly and curvature of image field fluctuates in the positive direction and further, the fluctuation of coma by the difference in angle of view is also increased. Conversely, if the lower limit of this condition is exceeded, a back focal length can be secured, but spherical aberration will be undercorrected and coma and curvature of image field will fluctuate greatly, and further, the fluctuation of coma by the difference in angle of view will also be increased. Also, the edge thickness of the lens will become extremely small and difficulties will be encountered in the manufacture.

Further, the fifth and sixth embodiments are constructed so as to satisfy the following conditions:

$$-6 \leq \frac{r_b + r_a}{r_b - r_a} \leq -2.8 \quad \text{(IX)}$$

$$-1 \leq \frac{r_e + r_d}{r_e - r_d} \leq 0 \quad \text{(X)}$$

where
- $r_d$: the radius of curvature of the object side surface of the positive lens component of the forward group $G_{2F}$ of the second lens group which is positioned most adjacent to the image side.
- $r_e$: the radius of curvature of the image side surface of the positive lens component of the forward group $G_{2F}$ of the second lens group which is positioned most adjacent to the image side.

It is very effective to construct the present invention so as to satisfy the condition (VIII) as mentioned above, but if the present invention is constructed so as to further satisfy the condition (IX), it will be advantageous in terms of aberrations when achieving a wider angle of view.

Also, if the present invention is constructed so as to satisfy the condition (X), the burden of the aberration correction in the rearward group of the second lens group will become small and good aberration correction can be accomplished.

Further, in the present invention, in order to make the rearward group $G_{2R}$ as compact and light in weight as possible, it is desirable that the rearward group $G_{2R}$ be comprised of three lenses, i.e., an aspherical lens having an aspherical shape, and a lens component comprising a positive lens and a negative lens cemented together and having as a whole the shape of a positive meniscus lens having its convex surface facing the image side. If the lens having an aspherical surface is formed of plastics, making the surface aspherical will be easy as compared with a glass lens, and this will lead to good efficiency of mass production and high effectiveness.

Also, if the vertex power of the lens having an aspherical surface is of a value approximate to 0, it will be advantageous for preventing particularly the focal length, the back focal length and the on-axis chromatic aberration from being varied by a change in the temperature of plastics.

Specifically, if the following condition is satisfied with respect to the vertex power $\phi$ of the lens having an aspherical surface, it will be more effective.

$$0 \leq 1|\phi|1 \leq 0.009 \quad \text{(XI)}$$

$$\phi = \frac{1}{f_{ASP}}$$

$f_{ASP}$: the paraxial focal length of the lens having an aspherical surface (mm).

In the present invention, it is desirable that the positive lens component in the second lens group as described above be comprised of a positive lens and a negative lens cemented together and be constructed so as to assume as a whole a meniscus shape having its convex surface facing the image side, and in this case, it is preferable that said positive lens component be constructed so as to satisfy the following conditions:

$$|r_a| > |r_c|, r_c < 0, r_a < 0 \quad \text{(XIII)}$$

$$V_p - V_n \geq 25 \quad \text{(XIII)}$$

where
- $r_c$: the radius of curvature of the cemented surface in the positive meniscus lens component having its convex surface facing the image side in the rearward group of the second lens group.
- $V_p$: the Abbe number of the positive lens in the positive meniscus lens component having its convex surface facing the image side in the rearward group of the second lens group.
- $V_n$: the Abbe number of the negative lens in the positive meniscus lens component having its convex surface facing the image side in the rearward group of the second lens group.

If said positive lens component is constructed so as to satisfy the condition (XII), the cemented surface in the positive meniscus lens component having its convex surface facing the image side in the rearward group of the second lens group assumes a concentric shape relative to the stop position and therefore, particularly the occurence of coma and curvature of image field can be reduced and further, the bending of chromatic difference of magnification can be suppressed to a relatively small value.

If said positive lens component is constructed so as to satisfy the condition (XIII), the fluctuation of chromatic difference of magnification caused by the movement of the rearward group of the second lens group by focusing can be corrected well, but it is desirable that said positive lens component be constructed so as to further satisfy $V_p - V_n \geq 28$.

If the refractive power of the forward group $G_{2F}$ of the second group of the present invention is made positive, the positive refractive power of the entire second lens group can be shared with the rearward group $G_{2R}$ and therefore, the lens mechanism can be made simpler and the imaging function can be improved.

Various embodiments of the present invention will hereinafter be described. Each embodiment is a retrofocus type wide angle lens maintaining a focal length of 18 mm and brightness of F-number 3.5 and yet having an angle of view amounting to 100°.

Figure 9:
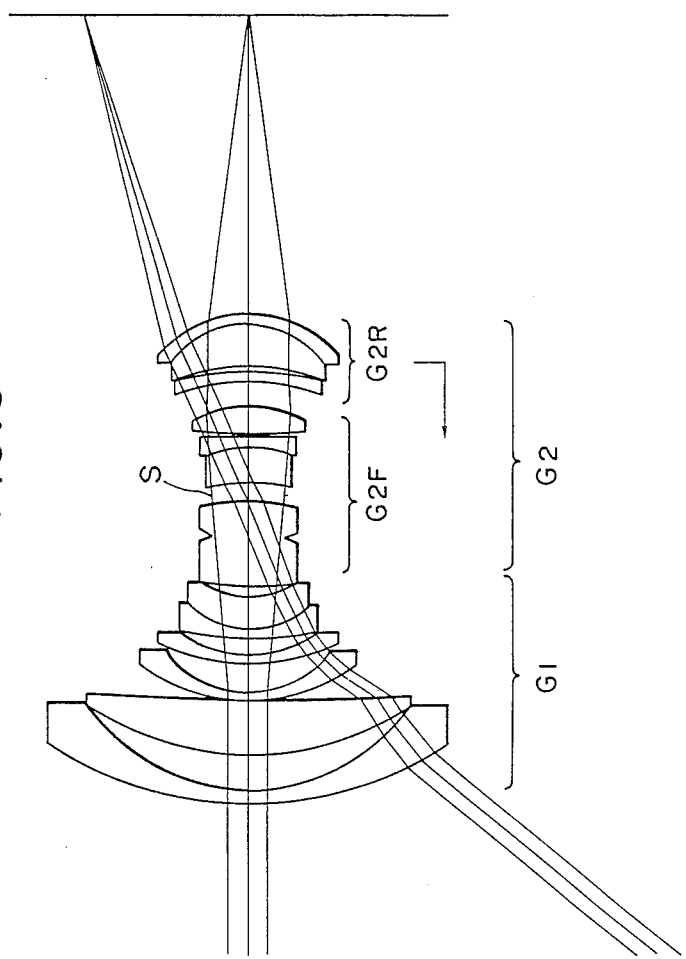
FIG. 9 shows the lens construction of a fifth embodiment of the present invention.
Figure 10:
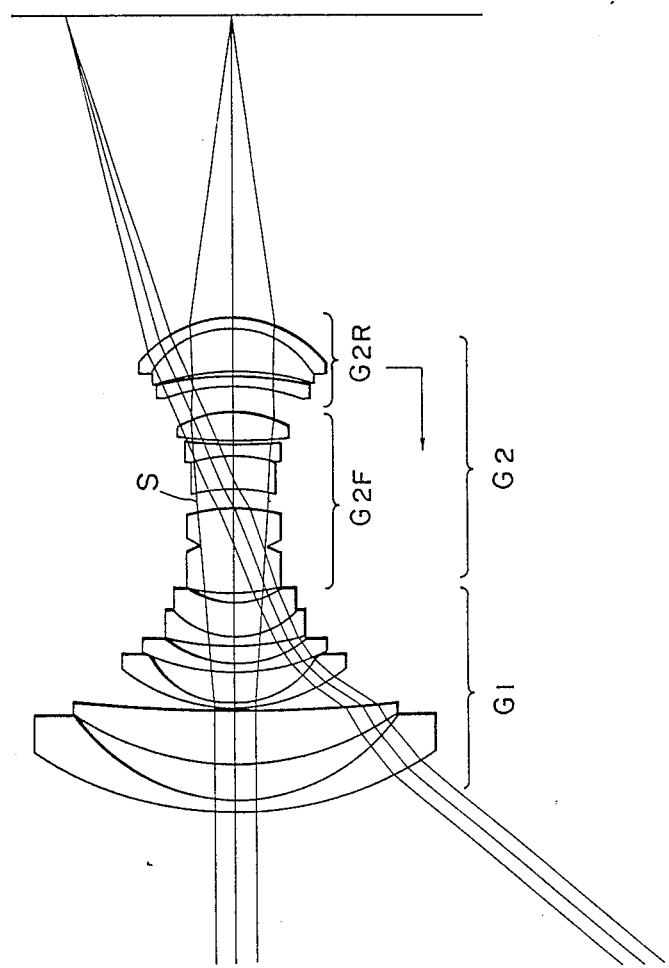
FIG. 10 shows the lens construction of a sixth embodiment of the present invention.

FIGS. 9 and 10 shows the fifth and sixth embodiments, respectively, of the present invention. The sixth embodiment has a lens construction similar to the fifth embodiment shown in FIG. 9.

As shown in FIGS. 9 and 10, the cut-away portion of the thick positive lens of the forward group $G_{2F}$ of the second lens group in each embodiment which is positioned most adjacent to the object side is for determining the light rays.

R represents the distance from the image plane to the object, $\beta$ represents the photographing magnification, and E-n in the aspherical shape is represented as $10^{-n}$.

The aspherical surface of the fifth embodiment has a shape in which the positive surface refractive power becomes weaker from the vertex toward the margin, and the aspherical surface of the sixth embodiment has a shape in which the negative surface refractive power becomes stronger from the vertex toward the margin. The action of the aspherical surface of the present invention is substantially the same for the shape in which the positive surface refractive power becomes weaker and the shape in which the negative surface refractive power becomes stronger

TABLE 5

(Fifth Embodiment)

| | r | d | ν | n |
|---|---|---|---|---|
| 1 | 48.468 | 1.50 | 45.4 | 1.79668 |
| 2 | 25.408 | 4.50 | | |
| 3 | 36.586 | 7.00 | 58.5 | 1.65160 |
| 4 | 307.778 | 0.10 | | |
| 5 | 21.467 | 1.00 | 45.4 | 1.79668 |
| 6 | 13.177 | 3.90 | | |
| 7 | 26.377 | 1.00 | 60.1 | 1.62041 |
| 8 | 13.648 | 2.50 | | |
| 9 | 39.310 | 1.00 | 60.1 | 1.62041 |
| 10 | 10.376 | 4.50 | 35.5 | 1.59507 |
| 11 | 13.044 | 1.20 | | |
| 12 | 28.874 | 11.00 | 27.8 | 1.69911 |
| 13 | −21.448 | 2.35 | | |
| 14 | −26.846 | 4.50 | 33.7 | 1.64831 |
| 15 | −14.715 | 1.20 | 23.0 | 1.86074 |
| 16 | 94.602 | 0.40 | | |
| 17 | 77.278 | 3.40 | 42.0 | 1.66755 |
| 18 | −14.604 | (variable) | | |
| 19 | −26.377 | 1.50 | 57.6 | 1.49108 |
| 20 | −24.967 | 0.70 | | |
| 21 | −23.894 | 5.30 | 67.9 | 1.59319 |
| 22 | −12.150 | 1.40 | 23.0 | 1.86074 |
| 23 | −15.154 | (B f) | | |
| R | ∞ | 300.000 | | |
| f | 18.388 | β = −0.084 | | |
| d18 | 3.466 | 1.416 | | |
| B f | 37.791 | 39.841 | | |

20th surface (aspherical surface)

k = 0.1000E + 01, C$_4$ = 0.6101E − 04
C$_6$ = 0.2141E − 06, C$_8$ = −0.1112E − 08,
C$_{10}$ = 0.4037E − 11

TABLE 6

(Sixth Embodiment)

| | r | d | ν | n |
|---|---|---|---|---|
| 1 | 48.468 | 1.50 | 45.4 | 1.79668 |
| 2 | 25.408 | 4.50 | | |
| 3 | 36.586 | 7.00 | 58.5 | 1.65160 |
| 4 | 307.778 | 0.10 | | |
| 5 | 21.467 | 1.00 | 45.4 | 1.79668 |
| 6 | 13.177 | 3.90 | | |
| 7 | 26.377 | 1.00 | 60.1 | 1.62041 |
| 8 | 13.648 | 2.50 | | |
| 9 | 39.310 | 1.00 | 60.1 | 1.62041 |
| 10 | 10.376 | 4.50 | 35.5 | 1.59507 |
| 11 | 13.044 | 1.20 | | |
| 12 | 28.874 | 11.00 | 27.8 | 1.69911 |
| 13 | −21.448 | 2.35 | | |
| 14 | −26.846 | 4.50 | 33.7 | 1.64831 |
| 15 | −14.715 | 1.20 | 23.0 | 1.86074 |
| 16 | 94.602 | 0.40 | | |
| 17 | 77.278 | 3.40 | 42.0 | 1.66755 |
| 18 | −14.604 | (variable) | | |
| 19 | −23.607 | 1.48 | 56.4 | 1.50137 |
| 20 | −26.397 | 0.02 | 55.9 | 1.49712 |
| 21 | −26.397 | 0.70 | | |
| 22 | −27.534 | 5.30 | 67.9 | 1.59319 |
| 23 | −12.276 | 1.40 | 23.0 | 1.86074 |
| 24 | −15.246 | (B f) | | |
| R | ∞ | 300.000 | | |
| f | 18.418 | β = −0.084 | | |
| d18 | 3.469 | 1.409 | | |
| B f | 38.036 | 40.096 | | |

20th surface and 21st surface (aspherical surfaces)

k = 0.1000E + 01, C$_4$ = 0.5877E − 04
C$_6$ = 0.2207E − 06, C$_8$ = −0.1418E − 08
C$_{10}$ = 0.5051E − 11

Condition-corresponding values in the fifth and sixth embodiments of the present invention will be shown below.

TABLE 7

(Condition-Corresponding Values)

| Embodiment | $\frac{r_b + r_a}{r_b - r_a}$ | $\frac{\|As - s\|}{f}$ | α |
|---|---|---|---|
| 5 | −4.47 | 0.0268 | 0.515 |
| 6 | −3.48 | 0.0270 | 0.515 |

TABLE 8

| Embodiment | $\frac{f_{2R}}{f}$ | $\frac{r_e + r_d}{r_e - r_d}$ | φ | $V_a - V_b$ |
|---|---|---|---|---|
| 5 | 3.32 | −0.68 | 0.00142 | 44.9 |
| 6 | 3.32 | −0.68 | −0.00184 | 44.9 |

The value of $$\frac{|As - s|}{f}$$

is the value when the effective diameters of the aspherical lenses in the fifth and sixth embodiments are 18.1 and 18.3, respectively.

The aspherical lens in the fifth embodiment is comprised of a plastic lens having an aspherical shape on the image side, and the aspherical lens in the sixth embodiment is formed by a compound lens comprising a glass lens having an aspherical shape on the image side and a thin plastic layer compounded therewith along the aspherical surface of said lens.

Also, the stops S in the fifth and sixth embodiments are both disposed at a position of 0.500 from the image side surface (the 13th surface) of the thick positive lens in the second lens group which is positioned most adjacent to the object side.

Each lens constituting the rearward group $G_{2R}$ is formed into a meniscus shape having its concave surface facing the stop S and therefore, it is of a shape very advantageous for mitigating particularly the off-axis aberration and the aberration fluctuation by short distance focusing.

Seventh, eighth an ninth embodiments of the present invention shown in FIGS. 11, 12 and 13, respectively, will now be described. In the seventh, eighth and ninth embodiments, the rearward group $G_{2R}$ is comprised of only two lenses, i.e., in succession from the object side, a positive lens and a negative lens, and therefore, as compared with the first to sixth embodiments, the back focal length can be secured sufficiently and the weight, size and amount of movement of the focusing group are made small, and this leads to good operability.

The seventh, eighth and ninth embodiments satisfy the following condition (VIII') differing in the upper limit value from the condition (VIII) shown in the fifth and sixth embodiments.

$$-6 \leq \frac{r_b + r_a}{r_b - r_a} \leq -1.2 \qquad \text{(VIII')}$$

Here, $r_a$ is the radius of curvature of the surface of the rearward group $G_{2R}$ which is most adjacent to the object side in a case where the positive lens and the negative lens constituting the rearward group $G_{2R}$ are cemented together, and it is the radius of curvature of the surface of the positive lens which is adjacent to the object side in a case where the rearward group $G_{2R}$ is separated. Further, here, $r_b$ is the radius of curvature of the surface of the rearward group $G_{2R}$ which is most adjacent to the image side in a case where the positive lens and the negative lens constituting the rearward group $G_{2R}$ are cemented together, and it is the radius of curvature of the surface of the positive lens which is adjacent to the image side in a case where the rearward group $G_{2R}$ is separated.

Also, the seventh, eighth and ninth embodiments satisfy the following condition (X') differing in the lower limit value from the condition (X) shown in the fifth and sixth embodiments.

$$-1.6 \leq \frac{r_e + r_d}{r_e - r_d} \leq 0 \quad (X')$$

The seventh embodiment is a retrofocus type lens maintaining a focal length of 18 mm and brightness of F-number ca. 3.5 and yet having an angle of view amounting to 100°. Each of eighth and ninth embodiments is a retrofocus type lens maintaining a focal length of 20 mm and brightness of ca. 2.8 and yet having an angle of view amounting to 94°.

Figure 11:
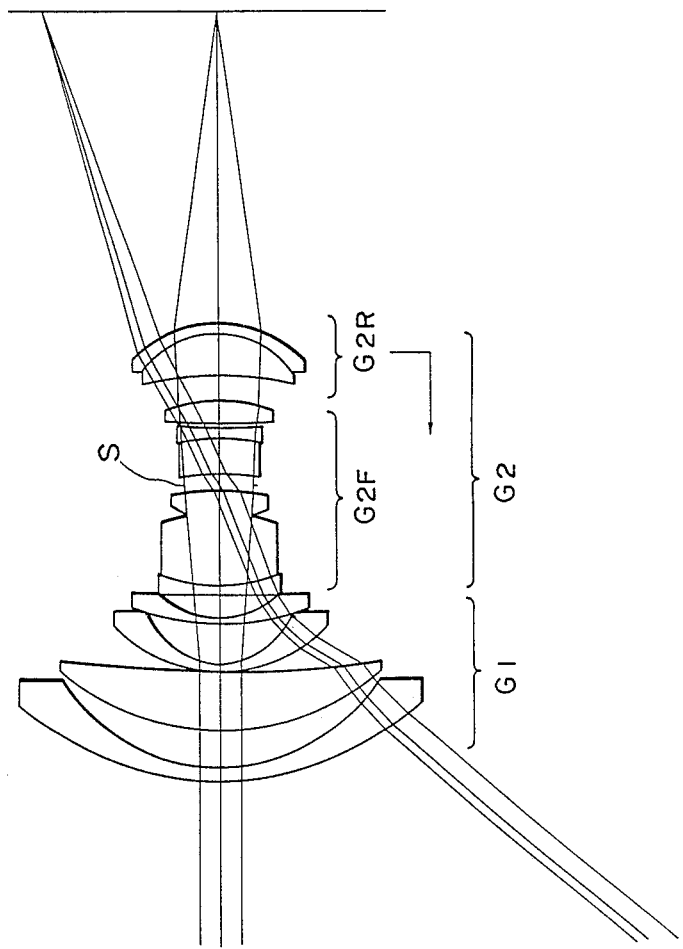
FIG. 11 shows the lens construction of a seventh embodiment of the present invention.

As shown in FIG. 11, in the seventh embodiment, the first lens group $G_1$ having a negative refractive power comprises four negative, positive, negative and negative meniscus lenses having their convex surfaces facing the object side; the forward group $G_{2F}$ having a positive refractive power comprises five lenses, i.e., a negative lens, a thick positive lens cemented thereto, a positive meniscus lens, a negative lens cemented thereto, and a positive lens; and the rearward group $G_{2R}$ having a positive refractive power comprises two positive and negative meniscus lenses having their convex surfaces facing the image side and cemented together.

Figure 12:
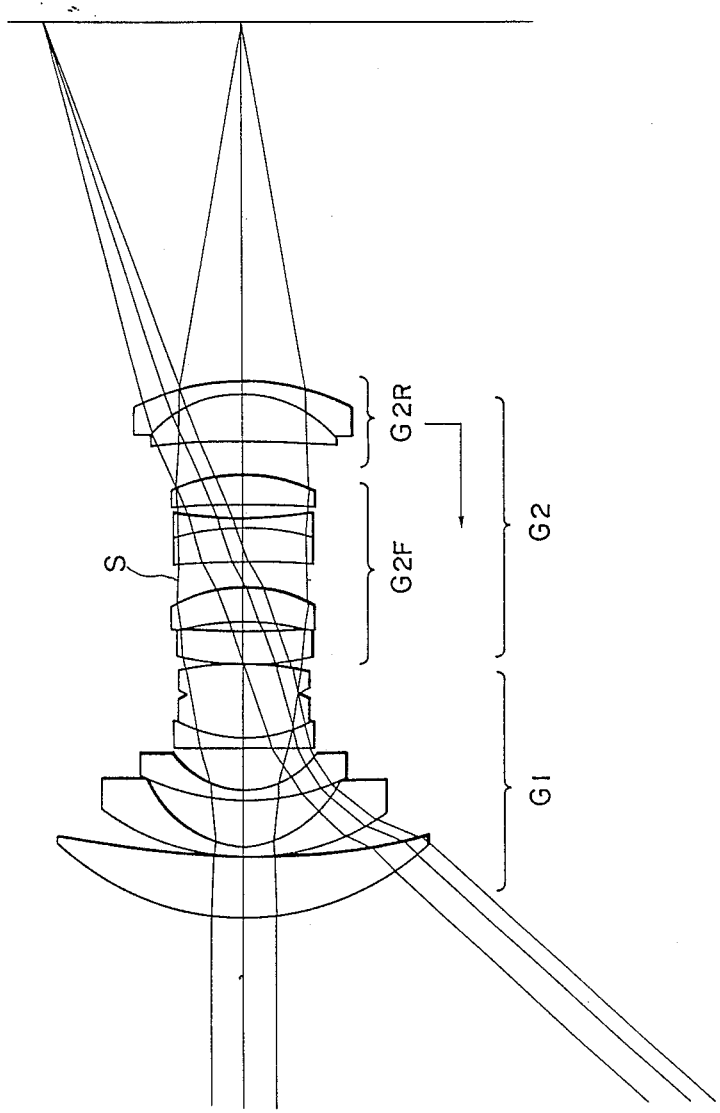
FIG. 12 shows the lens construction of an eighth embodiment of the present invention.
Figure 13:
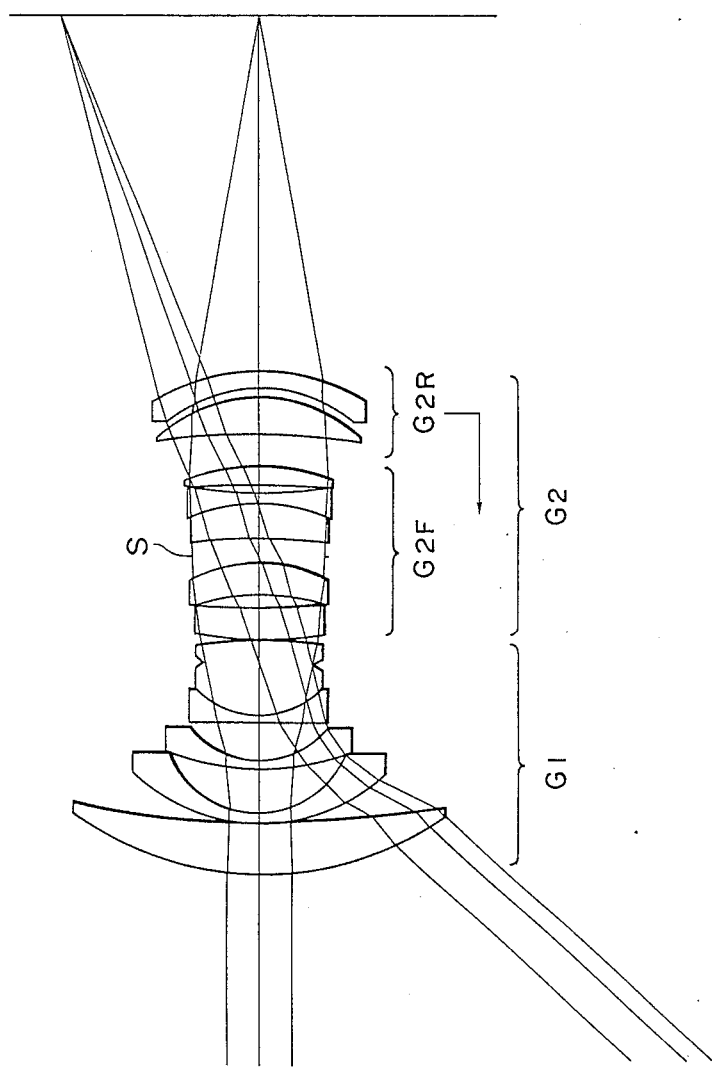
FIG. 13 shows the lens construction of a ninth embodiment of the present invention.

In the eighth embodiment shown in FIG. 12, the first lens group $G_1$ having a negative refractive power comprises five lenses, i.e., three positive, negative and negative meniscus lenses having their convex surfaces facing the object side, a negative lens and a thick positive lens cemented thereto; the forward group $G_{2F}$ having a positive refractive power comprises five lenses, i.e., a positive meniscus lens having its convex surface facing the object side, a positive meniscus lens having its convex surface facing the image side, a positive meniscus lens, a negative lens cemented thereto, and a positive lens; and the rearward group $G_{2R}$ having a positive refractive power comprises two positive and negative meniscus lenses having their convex surfaces facing the image side and cemented together. The rearward group $G_{2R}$ in the ninth embodiment comprises two positive and negative meniscus lenses separated from each other as shown in FIG. 13.

The data of the respective embodiments will be shown below. The method of tabling the data of these embodiments is similar to that for the first to sixth embodiments.

TABLE 9

(Seventh Embodiment)
$F_{NO} = 3.52$

| | r | d | Abbe | n |
|---|---|---|---|---|
| 1 | 39.376 | 1.60 | 45.4 | 1.79668 |
| 2 | 23.866 | 4.30 | | |
| 3 | 30.826 | 7.20 | 58.5 | 1.65160 |
| 4 | 149.984 | 0.10 | | |
| 5 | 18.801 | 1.00 | 45.4 | 1.79668 |
| 6 | 10.219 | 4.70 | | |
| 7 | 28.207 | 1.00 | 60.1 | 1.62041 |
| 8 | 12.302 | 2.50 | | |

TABLE 9-continued (Seventh Embodiment)
$F_{NO} = 3.52$

| | r | d | Abbe | n |
|---|---|---|---|---|
| 9 | 105.563 | 1.20 | 60.1 | 1.62041 |
| 10 | 19.563 | 11.80 | 27.8 | 1.69911 |
| 11 | −22.773 | 2.00 | | |
| 12 | −23.365 | 4.50 | 33.7 | 1.64831 |
| 13 | −17.244 | 1.20 | 23.0 | 1.86074 |
| 14 | 90.144 | 0.40 | | |
| 15 | 96.165 | 3.00 | 42.0 | 1.66755 |
| 16 | −19.675 | (variable) | | |
| 17 | −58.405 | 5.20 | 67.9 | 1.59319 |
| 18 | −11.825 | 1.40 | 23.0 | 1.86074 |
| 19 | −14.529 | (B f) | | |
| f | 18.435 | β = 0.084 | | |
| R | ∞ | 300.000 | | |
| d16 | 3.467 | 1.920 | | |
| B f | 37.958 | 39.505 | | |

17th surface (aspherical surface)
K = 0.10000E + 0.1, $C_4$ = −0.4541E − 04
$C_6$ = −0.1530E − 06, $C_8$ = 0.2059E − 08
$C_{10}$ = −0.1569E − 10

TABLE 10

(Eighth Embodiment)
$F_{NO} = 2.85$

| | r | d | Abbe | n |
|---|---|---|---|---|
| 1 | 28.812 | 6.50 | 82.6 | 1.49782 |
| 2 | 90.750 | 0.10 | | |
| 3 | 26.141 | 1.00 | 28.6 | 1.79504 |
| 4 | 11.200 | 5.00 | | |
| 5 | 24.099 | 1.00 | 57.6 | 1.67025 |
| 6 | 9.688 | 4.50 | | |
| 7 | −623.994 | 1.00 | 52.3 | 1.74810 |
| 8 | 14.282 | 8.00 | 32.2 | 1.67270 |
| 9 | −41.455 | 0.10 | | |
| 10 | 38.129 | 3.50 | 27.8 | 1.69911 |
| 11 | 262.071 | 1.10 | | |
| 12 | −27.367 | 3.40 | 35.5 | 1.59507 |
| 13 | −16.025 | 2.75 | | |
| 14 | −90.562 | 3.75 | 47.5 | 1.78797 |
| 15 | −28.133 | 1.20 | 26.1 | 1.78470 |
| 16 | 65.224 | 1.05 | | |
| 17 | −428.801 | 3.20 | 56.6 | 1.50137 |
| 18 | −20.385 | (variable) | | |
| 19 | −150.791 | 5.00 | 60.1 | 1.62041 |
| 20 | −13.658 | 1.60 | 25.5 | 1.73046 |
| 21 | −25.895 | (B f) | | |
| f | 20.399 | β = −0.093 | | |
| R | ∞ | 300.000 | | |
| d18 | 3.500 | 1.300 | | |
| B f | 37.896 | 40.095 | | |

19th surface (aspherical surface)
k = 0.1000E + 01, $C_4$ = −0.1090E − 04
$C_6$ = 0.6489E − 08, $C_8$ = −0.3739E − 09
$C_{10}$ = 0.1233E − 11

TABLE 11

(Ninth Embodiment)
$F_{NO} = 2.86$

| | r | d | Abbe | n |
|---|---|---|---|---|
| 1 | 32.838 | 5.50 | 82.6 | 1.49782 |
| 2 | 98.286 | 0.10 | | |
| 3 | 20.435 | 1.00 | 28.6 | 1.79504 |
| 4 | 10.557 | 4.50 | | |
| 5 | 23.243 | 1.00 | 49.4 | 1.77279 |
| 6 | 9.546 | 3.80 | | |
| 7 | 192.347 | 1.00 | 52.3 | 1.74810 |
| 8 | 9.754 | 8.00 | 32.2 | 1.67270 |
| 9 | −54.360 | 0.10 | | |
| 10 | 40.298 | 3.50 | 27.8 | 1.69911 |
| 11 | 224.269 | 1.10 | | |
| 12 | −30.795 | 3.50 | 35.5 | 1.59507 |
| 13 | −16.084 | 2.30 | | |
| 14 | −86.714 | 3.75 | 47.5 | 1.78797 |

TABLE 11-continued (Ninth Embodiment)
$F_{NO} = 2.86$

| | r | d | Abbe | n |
|---|---|---|---|---|
| 15 | −18.905 | 1.20 | 26.1 | 1.78470 |
| 16 | 63.203 | 0.60 | | |
| 17 | −782.958 | 2.50 | 56.3 | 1.50137 |
| 18 | −18.190 | (variable) | | |
| 19 | −88.061 | 4.00 | 60.1 | 1.62041 |
| 20 | −16.625 | 1.00 | | |
| 21 | −15.481 | 1.60 | 25.5 | 1.73046 |
| 22 | −22.970 | (B f) | | |
| f | 20.396 | $\beta = 0.0920$ | | |
| R | ∞ | 300.000 | | |
| d18 | 3.500 | 1.328 | | |
| B f | 37.886 | 40.058 | | |

19th surface (aspherical surface)
$k = 0.1000E + 01$, $C_4 = -0.1043E - 04$
$C_6 = 0.3801E - 07$, $C_8 = -0.6003E - 09$
$C_{10} = 0.1742E - 11$ Condition-corresponding values in the seventh to ninth embodiments of the present invention will be shown below.

TABLE 12

(Condition-Corresponding Values)

| Embodiment | $\frac{\|As - s\|}{f}$ | $\alpha$ | $\frac{f_{2R}}{f}$ |
|---|---|---|---|
| 7 | 0.0136 | −0.049 | 1.860 |
| 8 | 0.0047 | 0.395 | 2.950 |
| 9 | 0.0042 | 0.387 | 3.025 |

TABLE 13

| Embodiment | $\frac{r_b + r_a}{r_b - r_a}$ | $\frac{r_e + r_d}{r_e - r_d}$ | Va − Vb |
|---|---|---|---|
| 7 | −1.662 | −0.660 | 44.9 |
| 8 | −1.415 | −1.100 | 34.6 |
| 9 | −1.465 | −1.048 | 34.6 |

The value of $$\frac{|As - s|}{f}$$

is the value when the effective diameters of the lenses having aspherical surfaces in the seventh to ninth embodiments are 16.70, 18.75 and 18.93, respectively.

The stop S in the seventh embodiment is provided at a positive of 0.500 from the rear of the image side surface (the 11th surface) of the second thick positive lens in the forward group from the object side, and the stops S in the eighth and ninth embodiments are provided at positions of 0.650 and 0.600, respectively, from the rear of the image side surface (the 13th surface) of the second positive meniscus lens having its convex surface facing the image side in the forward group from the object side.

In the present invention, it is possible to provide an aspherical surface having the function of correcting the aberration fluctuation by short distance focusing on at least one surface of the lenses constituting the rearward group. Therefore, it is also possible to provide an aspherical surface on the convex surface, and thus, in this case, this aspherical surface has a shape in which the positive surface refractive power becomes weaker from the vertex toward the margin. As previously described, this aspherical shape is equivalent to the characteristic shape in the present invention in which the negative surface refractive power becomes weaker from the vertex toward the margin.

Also, where the aspherical surface of the present invention is provided on that lens in the rearward group $G_{2R}$ which is positioned most adjacent to the image side, it is desirable to somewhat change the construction of the lenses which are more adjacent to the object side than the stop S.

What is claimed is:

1. A retrofocus type lens system comprising, in the order named from an object side:
    a first lens group having a negative refracting power; and
    a second lens group having a positive refracting power, said second lens group being constituted by a front group having a positive refracting power and a rear group which has a positive refracting power and is movable along an optical axis to perform focusing;
    said rear group having an aspherical surface, said aspherical surface having a shape in which a negative surface refracting power is increased from a lens vertex to a periphery thereof, so that said aspherical surface corrects variations in coma and curvature of field when said rear group is moved to perform close distance focusing, said negative surface refracting power being defined as a difference between an incident angle and an exit angle of an arbitrary ray incident on an arbitrary point of a refracting surface.

2. A retrofocus type lens system according to claim 1, wherein said rear group is moved to the object side in performing close distance focusing.

3. A retrofocus type lens system comprising a first lens group having a negative refracting power and a second lens group having a positive refracting power in the order named from an object side, wherein said second lens group is constituted by a front group having a positive refracting power and a rear group which has a positive refracting power and is movable along an optical axis to perform focusing, and said rear group has an aspherical surface, said aspherical surface having a shape in which the negative surface refracting power is increased from a lens vertex to a periphery thereof, and which corrects variations in aberrations, and wherein the aspherical surface of said aspherical lens satisfies the following condition:

$$0 < \frac{|AS - S|}{f} < 0.2$$

where
    f: focal length of entire system
    AS−S: difference between aspherical surface AS at outermost position of effective diameter of spherical surface and reference spherical surface S having predetermined radius of curvature of vertex along optical axis.

4. A lens system according to claim 3, characterized by the following data:
    Focal length: f=20.442
    F-number: 2.8
    Field angle: 2ω=94°

| No. | Radius of curvature r | Central thickness · Distance d | Refractive index n | ABBE number ν | |
|---|---|---|---|---|---|
| 1 | 37.995 | 5.000 | 1.51860 | 70.08 | G₁ |
| 2 | 95.859 | 0.100 | | | |
| 3 | 23.281 | 1.400 | 1.80458 | 25.49 | |
| 4 | 10.195 | 5.000 | | | |
| 5 | 36.935 | 1.200 | 1.71300 | 53.97 | |
| 6 | 12.047 | 3.200 | | | |
| 7 | 146.392 | 3.200 | 1.80458 | 25.49 | |
| 8 | −56.052 | 1.300 | 1.74810 | 52.28 | |
| 9 | 10.566 | 5.000 | 1.67270 | 32.16 | |
| 10 | −35.743 | 0.100 | | | G₂F |
| 11 | 39.235 | 3.300 | 1.67270 | 32.16 | |
| 12 | 597.045 | 1.500 | | | |
| 13 | −36.762 | 3.200 | 1.58267 | 46.46 | |
| 14 | −14.665 | 2.600 | | | |
| 15 | −32.150 | 3.500 | 1.77279 | 49.44 | |
| 16 | −10.048 | 1.100 | 1.79504 | 28.61 | |
| 17 | 52.115 | 1.000 | | | |
| 18 | 59.969 | 3.000 | 1.51860 | 70.08 | |
| 19 | −20.708 | d₁₉ = variable | | | |
| 20 | −50.000 | 1.200 | 1.49108 | 57.57 | G₂R |
| 21 | ●−50.000 | 1.200 | | | |
| 22 | −38.396 | 4.000 | 1.51860 | 70.08 | |
| 23 | −17.634 | Bf = variable | | | | r₂₁ Aspherical surface (●)
Bf 37.981 ~ 40.406
d₁₉ 3.623 ~ 1.252

5. A lens system according to claim 3, characterized by the following data:
Focal length: f=20.537
F-number: 2.89
Field angle: 2ω=95°

| No. | Radius of curvature r | Central thickness · Distance d | Refractive index n | ABBE number ν | |
|---|---|---|---|---|---|
| 1 | 40.684 | 5.350 | 1.48749 | 70.24 | G₁ |
| 2 | 134.136 | 0.100 | | | |
| 3 | 25.122 | 1.500 | 1.79504 | 28.61 | |
| 4 | 10.858 | 5.350 | | | |
| 5 | 38.293 | 1.300 | 1.67025 | 57.58 | |
| 6 | 12.480 | 3.200 | | | |
| 7 | 251.347 | 2.150 | 1.80458 | 25.49 | |
| 8 | −100.595 | 0.550 | | | |
| 9 | −375.019 | 1.400 | 1.74810 | 52.28 | |
| 10 | 13.494 | 5.350 | 1.67270 | 32.16 | G₂F |
| 11 | −51.750 | 0.100 | | | |
| 12 | 40.944 | 3.500 | 1.67270 | 32.16 | |
| 13 | 606.477 | 1.100 | | | |
| 14 | −26.965 | 3.400 | 1.59507 | 35.51 | |
| 15 | −15.776 | 2.700 | | | |
| 16 | −37.264 | 3.750 | 1.78797 | 47.53 | |
| 17 | −16.451 | 1.200 | 1.78470 | 26.07 | |
| 18 | 98.285 | 1.050 | | | |
| 19 | 174.298 | 3.200 | 1.50137 | 56.46 | |
| 20 | −19.483 | d₂₀ = variable | | | |
| 21 | ●−80.075 | 1.800 | 1.49108 | 57.57 | G₂R |
| 22 | −80.074 | 1.255 | | | |
| 23 | −73.455 | 6.000 | 1.69680 | 55.61 | |
| 24 | −14.371 | 1.600 | 1.71736 | 29.48 | |
| 25 | −26.293 | Bf = variable | | | | r₂₁ Aspherical surface (●)
Bf 38.596 ~ 40.932
d₂₀ 3.377 ~ 1.041

6. A lens system according to claim 3, characterized by the following data:
Focal length: f=20.43
F-number: 2.84
Field angle: 2ω=94°

| No. | Radius of curvature r | Central thickness · Distance d | Refractive index n | ABBE number ν | |
|---|---|---|---|---|---|
| 1 | 40.829 | 5.350 | 1.48749 | 70.24 | G₁ |
| 2 | 134.005 | 0.100 | | | |
| 3 | 25.199 | 1.500 | 1.79504 | 28.61 | |
| 4 | 10.862 | 5.350 | | | |
| 5 | 38.806 | 1.300 | 1.67025 | 57.58 | |
| 6 | 12.467 | 3.200 | | | |
| 7 | 262.298 | 2.150 | 1.80458 | 25.49 | |
| 8 | −100.528 | 0.550 | | | |
| 9 | −375.086 | 1.400 | 1.74810 | 52.28 | |
| 10 | 13.868 | 5.350 | 1.67270 | 32.16 | G₂F |
| 11 | −51.061 | 0.100 | | | |
| 12 | 41.413 | 3.500 | 1.67270 | 32.16 | |
| 13 | 602.176 | 1.100 | | | |
| 14 | −27.056 | 3.400 | 1.59507 | 35.51 | |
| 15 | −15.804 | 2.700 | | | |
| 16 | −38.208 | 3.750 | 1.78797 | 47.53 | |
| 17 | −16.474 | 1.200 | 1.78470 | 26.07 | |
| 18 | 103.533 | 1.050 | | | |
| 19 | 152.349 | 3.200 | 1.50137 | 56.46 | |
| 20 | −20.336 | d₂₀ = variable | | | |
| 21 | −80.000 | 1.800 | 1.49108 | 57.57 | G_C |
| 22 | ●−80.001 | d₂₂ = variable | | | |
| 23 | −83.420 | 6.000 | 1.69680 | 55.61 | G_f |
| 24 | −14.454 | 1.600 | 1.71736 | 29.48 | |
| 25 | −27.124 | Bf = variable | | | | r₂₂ Aspherical surface (●)
d₂₀ 3.3105 ~ 1.1060
d₂₂ 1.5974 ~ 1.4814
Bf 38.1052 ~ 40.4905

7. A lens system according to claim 3, characterized by the following data:
Focal length: f=20.54
F-number: 2.89
Field angle: 2ω=94°

| No. | Radius of curvature r | Central thickness · Distance d | Refractive index n | ABBE number ν | |
|---|---|---|---|---|---|
| 1 | 40.684 | 5.350 | 1.48749 | 70.24 | G₁ |
| 2 | 134.136 | 0.100 | | | |
| 3 | 25.122 | 1.500 | 1.79504 | 28.61 | |
| 4 | 10.858 | 5.350 | | | |
| 5 | 38.293 | 1.300 | 1.67025 | 57.58 | |
| 6 | 12.480 | 3.200 | | | |
| 7 | 251.347 | 2.150 | 1.80458 | 25.49 | |
| 8 | −100.595 | 0.550 | | | |
| 9 | −375.019 | 1.400 | 1.74810 | 52.28 | |
| 10 | 13.494 | 5.350 | 1.67270 | 32.16 | G₂F |
| 11 | −51.750 | 0.100 | | | |
| 12 | 40.944 | 3.500 | 1.67270 | 32.16 | |
| 13 | 606.477 | 1.100 | | | |
| 14 | −26.965 | 3.400 | 1.59507 | 35.51 | |
| 15 | −15.776 | 2.700 | | | |
| 16 | −37.264 | 3.750 | 1.78797 | 47.53 | |
| 17 | −16.451 | 1.200 | 1.78470 | 26.07 | |
| 18 | 98.285 | 1.050 | | | |
| 19 | 174.298 | 3.200 | 1.50137 | 56.46 | |
| 20 | −19.483 | d₂₀ = variable | | | |
| 21 | ●−80.075 | 1.800 | 1.49108 | 57.57 | G_C |
| 22 | −80.074 | d₂₂ = variable | | | |
| 23 | −73.455 | 6.000 | 1.69680 | 55.61 | G_f |
| 24 | −14.371 | 1.600 | 1.71736 | 29.48 | |
| 25 | −26.293 | Bf = variable | | | | r₂₁ Aspherical surface (●)
d₂₀ 3.3766 ~ 1.1576
r₂₂ 1.2553 ~ 1.1386
Bf 38.5960 ~ 40.9320

8. A retrofocus type lens system comprising, in the order named from an object side:
a first lens group having a negative refracting power; and a second lens group having a positive refracting power, said second lens group being constituted by a front group having a positive refracting power and a rear group which has a positive refracting power and is movable along an optical axis to perform focusing:

said rear group having an aspherical surface, said aspherical surface having a shape in which a positive surface refracting power is decreased from a lens vertex to a periphery thereof, so that said aspherical surface corrects variations in coma and curvature of field when said rear group is moved to perform close distance focusing, said positive surface refracting power being defined as a difference between an incident angle and an exit angle of an arbitrary ray incident on an arbitrary point of a refracting surface.

9. A retrofocus type lens system according to claim 8, wherein said rear group is moved to the object side in performing close distance focusing.

10. A retrofocus type lens system comprising a first lens group having a negative refracting power and a second lens group having a positive refracting power in the order named from an object side, wherein said second lens group is constituted by a front group having a positive refracting power and a rear group which has a positive refracting power and is movable along an optical axis to perform focusing, and said rear group has an aspherical surface, said aspherical surface having a shape in which the negative surface refracting power is increased from a lens vertex to a periphery thereof, and which corrects variations in aberrations, and wherein said lens system satisfies the following conditions when a focal length of said movable rear group is given by $f_{2R}$ and an angle formed by an optical axis and a paraxial ray from an infinity object point along the optical axis and incident on a lens surface, closest to the object side of said rear group is given by $\alpha$:

$$-1.0 \leq \alpha \leq 1.0$$
$$0.7 \leq \frac{f_{2R}}{f} \leq 6.0$$

where
- f: focal length of entire system
- $\alpha$: value obtained by calculating angle formed between optical axis and paraxial ray from infinity object point along optical axis and incident on a lens surface closest to object side of rear group, using $\alpha_1 = 0$ and $h_1 = f$ as initial values of the paraxial ray tracing formula
- $\alpha_1$: angle formed between paraxial ray incident on frontmost lens surface and optical axis
- h: incident height of paraxial ray incident on frontmost lens surface.

11. A retrofocus type lens system comprising a first lens group having a negative refracting power and a second lens group having a positive refracting power in the order named from an object side, wherein said second lens group is constituted by a front group having a positive refracting power and a rear group which has a positive refracting power and is movable along an optical axis to perform focusing, and said rear group has an aspherical surface, said aspherical surface having a shape in which the negative surface refracting power is increased from a lens vertex to a periphery thereof, and which corrects variations in aberrations, and wherein said rear group comprises a correction group including said aspherical lens for correcting aberrations and a focusing group which is moved relative to said correction group and has a focusing function, and satisfies the following conditions when a moving distance of said correction group is given by $l_c$, a moving distance of said focusing group is given by $l_f$, an angle formed by an optical axis and a paraxial ray from an infinity object point along the optical axis and incident on said correction group is given by $\alpha_c$, and an angle formed by an optical axis and a paraxial ray from an infinity object point along the optical axis and incident on said focusing group is given by $\alpha_f$:

$$-1.0 \leq \alpha_c \leq 1.0$$
$$-1.0 \leq \alpha_f \leq 1.0$$
$$0 < \left| \frac{l_c}{l_f} \cdot \frac{f_f}{f_c} \right| \leq 6.0$$

where
- $\alpha_c$: value obtained by calculating angle formed between optical axis and paraxial ray from infinity object point along optical axis and incident on a lens surface closest to object side of correction group, using $\alpha_1 = 0$ and $h_1 = f$ as initial values of the paraxial ray tracing formula
- $\alpha_f$: value obtained by calculating angle formed between optical axis and paraxial ray from infinity object point along optical axis and incident on a lens surface closest to object side of correction group, using $\alpha_1 = 0$ and $h_1 = f$ as initial values of the paraxial ray tracing formula
- f: focal length of entire system
- $\alpha_1$: angle formed by optical axis and paraxial ray incident on frontmost lens surface of said first lens group
- $h_1$: incident height of paraxial ray incident on frontmost lens surface of first lens group
- $f_c$: focal length of correction lens group
- $f_f$: focal length of focusing lens group
- $l_c$: focusing moving distance of correction group in rear group of second lens group
- $l_f$: focusing moving distance of focusing group in rear group of second lens group.

* * * * *